US009690635B2

(12) United States Patent
Gupta et al.

(10) Patent No.: US 9,690,635 B2
(45) Date of Patent: Jun. 27, 2017

(54) COMMUNICATING BEHAVIOR INFORMATION IN A MOBILE COMPUTING DEVICE

(71) Applicant: QUALCOMM Incorporated, San Diego, CA (US)

(72) Inventors: Rajarshi Gupta, Sunnyvale, CA (US); Soorgoli Ashok Halambi, Sunnyvale, CA (US); Sudha A. Gathala, Santa Clara, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 13/796,595

(22) Filed: Mar. 12, 2013

(65) Prior Publication Data
US 2013/0304869 A1 Nov. 14, 2013

Related U.S. Application Data

(60) Provisional application No. 61/752,144, filed on Jan. 14, 2013, provisional application No. 61/646,590,
(Continued)

(51) Int. Cl.
*G06F 15/16* (2006.01)
*G06F 9/54* (2006.01)
(Continued)

(52) U.S. Cl.
CPC ............ *G06F 9/541* (2013.01); *G06F 21/554* (2013.01); *G06F 21/44* (2013.01); *G06F 21/564* (2013.01)

(58) Field of Classification Search
CPC .................................................. G06F 21/564
(Continued)

(56) References Cited

U.S. PATENT DOCUMENTS 5,870,735 A 2/1999 Agrawal et al.
6,532,541 B1 3/2003 Chang et al.
(Continued)

FOREIGN PATENT DOCUMENTS

CN 1961525 A 5/2007
CN 101770453 A 7/2010
(Continued)

OTHER PUBLICATIONS

Abu-Nimeh S., "Phishing detection using distributed Bayesian additive regression trees", Dec. 13, 2008 (Dec. 13, 2008), Southern Methodist University, 28 pages, XP055107295, ISBN: 9780549908630 chapters 2, 4, 6 and 8.
(Continued)

*Primary Examiner* — Wing F Chan
*Assistant Examiner* — Joseph Maniwang
(74) *Attorney, Agent, or Firm* — Nicholas A. Cole

(57) ABSTRACT

Methods, systems and devices for communicating behavior analysis information using an application programming interface (API) may include receiving data/behavior models from one or more third-party network servers in a client module of a mobile device and communicating the information to a behavior observation and analysis system via a behavior API. The third-party servers may be maintained by one or more partner companies that have domain expertise in a particular area or technology that is relevant for identifying, analyzing, classifying, and/or reacting to mobile device behaviors, but that do not have access to (or knowledge of) the various mobile device sub-systems, interfaces, configurations, modules, processes, drivers, and/or hardware systems required to generate effective data/behavior models suitable for use by the mobile device. The behavior API and/or client modules allow the third-party server to quickly (Continued)

US 9,690,635 B2

Page 2 and efficiently access the most relevant and important information on the mobile device.

15 Claims, 11 Drawing Sheets

Related U.S. Application Data filed on May 14, 2012, provisional application No. 61/683,274, filed on Aug. 15, 2012.

(51) Int. Cl.
*G06F 21/55* (2013.01)
*G06F 21/56* (2013.01)
*G06F 21/44* (2013.01)

(58) Field of Classification Search
USPC ............................................. 709/219, 224
See application file for complete search history.

(56) References Cited

U.S. PATENT DOCUMENTS

| | | | |
|---|---|---|---|
| 6,643,802 B1 | 11/2003 | Frost et al. | |
| 6,647,260 B2 | 11/2003 | Dusse et al. | |
| 7,051,327 B1 | 5/2006 | Milius et al. | |
| 7,401,359 B2 | 7/2008 | Gartside et al. | |
| 7,559,053 B2 | 7/2009 | Krassovsky et al. | |
| 7,561,877 B2 | 7/2009 | Cassett et al. | |
| 7,571,478 B2 | 8/2009 | Munson et al. | |
| 7,600,014 B2 | 10/2009 | Russell et al. | |
| 7,650,317 B2 | 1/2010 | Basu et al. | |
| 7,676,573 B2 | 3/2010 | Herzog et al. | |
| 7,694,150 B1 | 4/2010 | Kirby | |
| 7,757,292 B1 | 7/2010 | Renert et al. | |
| 7,774,599 B2 | 8/2010 | Guo et al. | |
| 7,831,237 B2 | 11/2010 | Passarella et al. | |
| 7,831,248 B2 | 11/2010 | Lee | |
| 7,849,360 B2 | 12/2010 | Largman et al. | |
| 7,852,938 B2 | 12/2010 | Shi et al. | |
| 7,877,621 B2 | 1/2011 | Jacoby et al. | |
| 7,881,291 B2 | 2/2011 | Grah | |
| 7,890,443 B2 | 2/2011 | Zhang et al. | |
| 7,945,955 B2 | 5/2011 | Katkar | |
| 8,045,958 B2 | 10/2011 | Kahandaliyanage | |
| 8,087,067 B2 | 12/2011 | Mahaffey et al. | |
| 8,095,964 B1 | 1/2012 | Zhong et al. | |
| 8,161,548 B1 | 4/2012 | Wan | |
| 8,201,244 B2 | 6/2012 | Sun et al. | |
| 8,201,249 B2 | 6/2012 | McCallam | |
| 8,225,093 B2 | 7/2012 | Fok et al. | |
| 8,245,295 B2 | 8/2012 | Park et al. | |
| 8,245,315 B2 | 8/2012 | Cassett et al. | |
| 8,266,698 B1 * | 9/2012 | Seshardi et al. | 726/24 |
| 8,311,956 B2 | 11/2012 | Sen et al. | |
| 8,312,545 B2 | 11/2012 | Tuvell et al. | |
| 8,321,941 B2 | 11/2012 | Tuvell et al. | |
| 8,331,987 B2 | 12/2012 | Rosenblatt | |
| 8,332,945 B2 | 12/2012 | Kim et al. | |
| 8,347,386 B2 | 1/2013 | Mahaffey et al. | |
| 8,397,301 B2 | 3/2013 | Hering et al. | |
| 8,443,439 B2 | 5/2013 | Lamastra et al. | |
| 8,458,809 B2 | 6/2013 | Adams et al. | |
| 8,516,584 B2 | 8/2013 | Moskovitch et al. | |
| 8,533,844 B2 | 9/2013 | Mahaffey et al. | |
| 8,554,912 B1 | 10/2013 | Reeves et al. | |
| 8,694,744 B1 | 4/2014 | Raj et al. | |
| 8,701,192 B1 | 4/2014 | Glick et al. | |
| 8,762,298 B1 | 6/2014 | Ranjan et al. | |
| 8,763,127 B2 | 6/2014 | Yao et al. | |
| 8,775,333 B1 | 7/2014 | Zahn | |
| 8,782,412 B2 | 7/2014 | Charles et al. | |
| 8,943,204 B2 | 1/2015 | Caldeira et al. | |
| 9,432,361 B2 | 8/2016 | Mahaffey et al. | |
| 2002/0099756 A1 | 7/2002 | Catthoor et al. | |
| 2004/0039924 A1 | 2/2004 | Baldwin et al. | |
| 2004/0068721 A1 | 4/2004 | O'Neill et al. | |
| 2004/0083366 A1 | 4/2004 | Nachenberg et al. | |
| 2004/0221163 A1 | 11/2004 | Jorgensen et al. | |
| 2005/0144480 A1 | 6/2005 | Kim et al. | |
| 2006/0026464 A1 | 2/2006 | Atkin et al. | |
| 2006/0085854 A1 | 4/2006 | Agrawal et al. | |
| 2006/0288209 A1 | 12/2006 | Vogler | |
| 2007/0006304 A1 | 1/2007 | Kramer et al. | |
| 2007/0136455 A1 | 6/2007 | Lee et al. | |
| 2007/0174490 A1 | 7/2007 | Choi et al. | |
| 2007/0192866 A1 | 8/2007 | Sagoo et al. | |
| 2007/0199060 A1 | 8/2007 | Touboul | |
| 2007/0220327 A1 | 9/2007 | Ruscio et al. | |
| 2007/0283170 A1 | 12/2007 | Yami et al. | |
| 2007/0287387 A1 | 12/2007 | Keum et al. | |
| 2007/0294768 A1 | 12/2007 | Moskovitch et al. | |
| 2008/0016339 A1 | 1/2008 | Shukla | |
| 2008/0026464 A1 | 1/2008 | Borenstein et al. | |
| 2008/0046755 A1 | 2/2008 | Hayes | |
| 2008/0047009 A1 | 2/2008 | Overcash et al. | |
| 2008/0086773 A1 | 4/2008 | Tuvell et al. | |
| 2008/0109495 A1 | 5/2008 | Herberger et al. | |
| 2008/0140821 A1 | 6/2008 | Tada | |
| 2008/0162686 A1 | 7/2008 | Kalaboukis et al. | |
| 2008/0163382 A1 | 7/2008 | Blue et al. | |
| 2008/0172746 A1 | 7/2008 | Lotter et al. | |
| 2008/0228429 A1 * | 9/2008 | Huang | G06F 1/1626 702/141 |
| 2009/0019546 A1 | 1/2009 | Park et al. | |
| 2009/0019551 A1 | 1/2009 | Haga et al. | |
| 2009/0192955 A1 * | 7/2009 | Tang | G06K 9/6269 706/12 |
| 2009/0199296 A1 | 8/2009 | Xie et al. | |
| 2009/0217078 A1 | 8/2009 | Cassett et al. | |
| 2009/0239531 A1 | 9/2009 | Andreasen et al. | |
| 2009/0287618 A1 | 11/2009 | Weinberger et al. | |
| 2009/0288080 A1 * | 11/2009 | Partridge | 717/178 |
| 2009/0288164 A1 | 11/2009 | Adelstein et al. | |
| 2009/0293121 A1 * | 11/2009 | Bigus | G06F 21/316 726/22 |
| 2009/0300765 A1 | 12/2009 | Moskovitch et al. | |
| 2009/0327168 A1 | 12/2009 | Weinberger et al. | |
| 2010/0005045 A1 | 1/2010 | Hiraoka et al. | |
| 2010/0010949 A1 | 1/2010 | Ito et al. | |
| 2010/0011029 A1 | 1/2010 | Niemel | |
| 2010/0036786 A1 | 2/2010 | Pujara | |
| 2010/0082513 A1 | 4/2010 | Liu | |
| 2010/0105404 A1 | 4/2010 | Palanki et al. | |
| 2010/0107257 A1 | 4/2010 | Ollmann | |
| 2010/0128125 A1 | 5/2010 | Warzelhan | |
| 2010/0153371 A1 | 6/2010 | Singh | |
| 2010/0154032 A1 | 6/2010 | Ollmann | |
| 2010/0175135 A1 | 7/2010 | Kandek et al. | |
| 2010/0192201 A1 | 7/2010 | Shimoni et al. | |
| 2010/0192222 A1 | 7/2010 | Stokes et al. | |
| 2010/0241974 A1 | 9/2010 | Rubin et al. | |
| 2010/0251340 A1 | 9/2010 | Martin et al. | |
| 2010/0262693 A1 | 10/2010 | Stokes et al. | |
| 2010/0296496 A1 | 11/2010 | Sinha et al. | |
| 2010/0299292 A1 | 11/2010 | Collazo | |
| 2010/0313269 A1 | 12/2010 | Ye | |
| 2011/0004935 A1 | 1/2011 | Moffie et al. | |
| 2011/0013528 A1 | 1/2011 | Chen | |
| 2011/0023118 A1 | 1/2011 | Wright | |
| 2011/0060948 A1 | 3/2011 | Beebe | |
| 2011/0105096 A1 | 5/2011 | Dods et al. | |
| 2011/0145920 A1 | 6/2011 | Mahaffey et al. | |
| 2011/0161452 A1 | 6/2011 | Poornachandran et al. | |
| 2011/0219449 A1 | 9/2011 | St. Neitzel et al. | |
| 2011/0264764 A1 | 10/2011 | Kewalramani et al. | |
| 2011/0286437 A1 | 11/2011 | Austin et al. | |
| 2011/0302654 A1 | 12/2011 | Miettinen | |
| 2011/0302656 A1 | 12/2011 | El-Moussa | |
| 2011/0307233 A1 | 12/2011 | Tseng et al. | |
| 2012/0016633 A1 | 1/2012 | Wittenstein et al. | |
| 2012/0051228 A1 | 3/2012 | Shuman et al. | |
| 2012/0060219 A1 | 3/2012 | Larsson et al. | |

(56) References Cited

U.S. PATENT DOCUMENTS

| | | |
|---|---|---|
| 2012/0096539 A1 | 4/2012 | Hu et al. |
| 2012/0110174 A1* | 5/2012 | Wootton et al. ............... 709/224 |
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1* | 6/2012 | McReynolds ................ 726/24 |
| 2012/0167218 A1 | 6/2012 | Poornachandran et al. |
| 2012/0180126 A1 | 7/2012 | Liu et al. |
| 2012/0207046 A1 | 8/2012 | Di Pietro et al. |
| 2012/0210423 A1 | 8/2012 | Friedrichs et al. |
| 2012/0227105 A1 | 9/2012 | Friedrichs et al. |
| 2012/0233694 A1 | 9/2012 | Baliga et al. |
| 2012/0245481 A1 | 9/2012 | Blanco et al. |
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2012/0331137 A1 | 12/2012 | Olsen et al. |
| 2013/0014262 A1 | 1/2013 | Lee et al. |
| 2013/0031600 A1 | 1/2013 | Luna et al. |
| 2013/0066815 A1 | 3/2013 | Oka et al. |
| 2013/0073983 A1 | 3/2013 | Rasmussen et al. |
| 2013/0097706 A1 | 4/2013 | Titonis et al. |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0204812 A1 | 8/2013 | Sterzing et al. |
| 2013/0247187 A1* | 9/2013 | Hsiao ................ G06F 21/552 726/22 |
| 2013/0267201 A1 | 10/2013 | Gupta et al. |
| 2013/0303154 A1 | 11/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0007183 A1 | 1/2014 | Qureshi et al. |
| 2014/0032358 A1 | 1/2014 | Perkowitz et al. |
| 2014/0051432 A1 | 2/2014 | Gupta et al. |
| 2014/0053260 A1 | 2/2014 | Gupta et al. |
| 2014/0053261 A1 | 2/2014 | Gupta et al. |
| 2014/0096246 A1 | 4/2014 | Morrissey et al. |
| 2014/0150100 A1 | 5/2014 | Gupta et al. |
| 2014/0187177 A1 | 7/2014 | Sridhara et al. |
| 2014/0188781 A1 | 7/2014 | Fawaz |
| 2014/0205099 A1 | 7/2014 | Christodorescu et al. |
| 2014/0237595 A1 | 8/2014 | Sridhara et al. |
| 2014/0245306 A1 | 8/2014 | Gathala |
| 2014/0279745 A1 | 9/2014 | Esponda et al. |
| 2014/0317734 A1 | 10/2014 | Valencia et al. |
| 2014/0337862 A1 | 11/2014 | Valencia et al. |
| 2015/0148109 A1 | 5/2015 | Gupta et al. |
| 2015/0339675 A1 | 11/2015 | Tuchman et al. |
| 2015/0356462 A1 | 12/2015 | Fawaz et al. |
| 2016/0088009 A1 | 3/2016 | Gupta et al. |

FOREIGN PATENT DOCUMENTS

| | | |
|---|---|---|
| CN | 101882000 A | 11/2010 |
| CN | 102202102 A | 9/2011 |
| CN | 102591696 A | 7/2012 |
| EP | 1182552 A2 | 2/2002 |
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2680182 A1 | 1/2014 |
| JP | 2010113488 A | 5/2010 |
| JP | 2011138219 A | 7/2011 |
| JP | 2012212380 A | 11/2012 |
| KR | 20060033067 A | 4/2006 |
| TW | 200937198 A | 9/2009 |
| TW | 201129817 A | 9/2011 |
| TW | 201239618 A | 10/2012 |
| WO | 2006012375 | 2/2006 |
| WO | 2009017231 A2 | 2/2009 |
| WO | WO-2010048502 | 4/2010 |
| WO | 2010126416 A1 | 11/2010 |
| WO | 2011147580 A1 | 12/2011 |
| WO | 2013016692 | 1/2013 |
| WO | WO-2013080096 A1 | 6/2013 |
| WO | WO-2013172865 A1 | 11/2013 |
| WO | WO-2013173003 A2 | 11/2013 |
| WO | WO-2013173044 A2 | 11/2013 |

OTHER PUBLICATIONS

Chekina L., et al., "Detection of deviations in mobile applications network behavior", arXiv:1208.0564v2, Aug. 5, 2012 (Aug. 5, 2012), 5 pages, XP055107301, Retrieved from the Internet: URL: http://arxiv.org/abs/1208.0564v2 [retrieved on Nov. 1, 2013] the whole document.

Folino G., et al., "An ensemble-based evolutionary framework for coping with distributed intrusion detection", Genetic Programming and Evolvable Machines, vol. 11, No. 2, Feb. 7, 2010 (Feb. 7, 2010), pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009 (Sep. 15, 2009), pp. 675-678, XP055107983, DOI: 10.1109/WI-IAT.2009. 113 the whole document.

International Search Report and Written Opinion—PCT/US2013/ 038399—ISA/EPO—Feb. 6, 2014.

Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007 (Nov. 5, 2007), pp. 516-520, XP031200055, DOI: 10.1109/ WI-IATW.2007.52 the whole document.

Miluzzo E., et al., "Vision: mClouds—computing on clouds of mobile devices", Proceedings of the 3rd ACM Workshop on Mobile Cloud Computing and Services (MCS'12), Jun. 25, 2012 (Jun. 25, 2012), pp. 9-14, XP055107956, DOI: 10.1145/2307849.2307854 the whole document.

Schmidt A.D., et al., "Static analysis of executables for collaborative malware detection on android", Proceedings of the 2009 IEEE International Conference on Communications (ICC'09) , Jun. 14, 2009 (Jun. 14, 2009), 3 Pages, XP031506460, DOI: 10.1109/ICC. 2009.5199486 the whole document.

Shabtai A., et al., "A Andromalya: a behavioral malware detection framework for android devices", Journal of Intelligent Information Systems, Kluwer Academic Publishers, BO, vol. 38, No. 1, Jan. 6, 2011 (Jan. 6, 2011), pp. 161-190, XP019998836, ISSN: 1573-7675, DOI: 10.1007/S10844-010-0148-X paragraph [5.3.1]-paragraph [5.3.4].

Shamili A.S., et al., "Malware detection on mobile devices using distributed machine learning", Proceedings of the 20th International Conference on Pattern Recognition (ICPR'10), Aug. 23, 2010 (Aug. 23, 2010), pp. 4348-4351, XP031772702, DOI: 10.1109/ICPR. 2010.1057 the whole document.

Tabish S.M., "Malware detection using statistical analysis of byte-level file content", Proceedings of the ACM SIGKDD Workshop on Cybersecurity and Intelligence Informatics (CSI-KDD'09), Jun. 28, 2009 (Jun. 28, 2009), pp. 23-31, XP055107225, DOI: 10.1145/ 1599272.1599278 the whole document.

De Stefano C., et al., "Pruning GP-Based Classifier Ensembles by Bayesian Networks," Lecture Notes in Computer Science, Sep. 1, 2012 (Sep. 1, 2012), pp. 236-245, XP047016355, DOI: 10.1007/ 978-3-642-32937-1_24, Sections 1 and 2.

(56) References Cited

OTHER PUBLICATIONS

International Search Report and Written Opinion—PCT/US2013/078350—ISA/EPO—Oct. 29, 2014.
International Search Report and Written Opinion—PCT/US2013/078352—ISA/EPO—Nov. 10, 2014.
Saller K., et al., "Reducing Feature Models to Improve Runtime Adaptivity on Resource Limited Devices," Proceedings of the 16th International Software Product Line Conference (SPLC), Sep. 2, 2012 (Sep. 2, 2012), vol. 11, pp. 135-142, XP058009814, DOI: 10.1145/2364412.2364435, Section 5.
Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.
Lu Y. B., et al., "Using Multi-Feature and Classifier Ensembles to Improve Malware Detection", Journal of Chung Cheng Institute of Technology, vol. 39, No. 2, Nov. 2010 (Nov. 2010), pp. 57-72, XP55086345, ISSN: 0255-6030.
Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012 (Apr. 2012), pp. 349-358, XP55086347, ISSN: 2249-955.
Shabtai A., "Malware Detection on Mobile Devices," Eleventh International Conference on Mobile Data Management, IEEE Computer Society, 2010, pp. 289-290.
Sheen S., et al., "Network Intrusion Detection using Feature Selection and Decision tree classifier," TENCON—IEEE Region 10 Conference, 2008, pp. 1-4.
Caruana, et al., "An Empirical Comparison of Supervised Learning Algorithms", ICML, 2006, 8 pgs.
Caruana, et al., "An Empirical Evaluation of Supervised Learning in High Dimensions", ICML, 2008, 8 pgs.
Co-pending U.S. Appl. No. 13/558,527, filed Jul. 26, 2012.
Qin F., "System Support for Improving Software Dependability During Production Runs," Urbana, Illinois, 1998, pp. 1-116.
Shabtai A., et al., "Dectecting unknown malicious code by applying classification techniques on OpCode patterns," Security Informatics a Springer Open Journal, 2012, vol. 1 (1), pp. 1-22.
Wang Y-M., et al., "STRIDER: A Black-Box, State-based Approach to Change and Configuration Management and Support," 2003 LISA XVII—Oct. 26-31, 2003—San Diego, CA, pp. 165-178.
Kachirski O., et al., "Effective Intrusion Detection Using Windows Sensors in Wireless Ad Hoc Networks", IEEE Proceedings of the 36th Hawaii International Conference on System Sciences, 2002, 8 Pages.
Kirda E., et al., "Behavior-Based Spyware Detection", 15th USENIX Security Symposium, 2002, pp. 273-288.
Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.
Gavin McWilliams: "Malware detection methods for fixed and mobile networks", Centre for Secure Information Technologies—Queen's University Belfast, Jan. 23, 2013 (Jan. 23, 2013), pp. 1-21, XP017577639, [retrieved on Jan. 23, 2013] the whole document.
Jarle Kittilsen: "Detecting malicious PDF documents", Dec. 1, 2011 (Dec. 1, 2011), pp. 1-112, XP055947997, Gjovik, Norway Retrieved from the Internet: URL:http:f/brage.bibsys.no/hig/retrieve/21 28/Jarle Kittilsen.pdf [retreived on Dec. 14, 2012] the whole document.
Kaspersky Endpoint Security 8 for Smartphone Program Version 8.0, Updated on Feb. 8, 2012.
Kolter J.Z., et al., "Learning to Detect Malicious Executables in the Wild", ACM Knowl. Discovery and Data Mining (KDD), 2004, pp. 470-478.
Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.
Yerima.S.Y. et al., "A New Android Malware Detection Approach Using Bayesian Classification", 2014 IEEE 28th International Conference on advanced Information Networking and Applications, IEEE, Mar. 25, 2013 ( Mar. 25, 2013), pp. 121-128, XP032678454, ISSN: 1550-445X, DOI: 10.1109/AINA.2013.88 ISBN: 978-1-4673-5550-6 [retrived on Jun. 13, 2013] the whole document.
Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9, 1999-May 12, 1999.
Tan, P.N., et al., "Introduction to data mining," Library of Congress, 2006, Chapter 4.
Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27-Aug. 1, 2008, pp. 160-165.
Faddoul J.B., et al., "Boosting Multi-Task Weak Learners with Applications to Textual and Social Data," Ninth International Conference on Machine Learning and Applications (ICMLA), Dec. 2010, pp. 367-372.
Niculescu-Mizil A., et al., "Predicting Good Probabilities with Supervised Learning", Proceedings/Twenty-Second International Conference on Machine Learning, Bonn, Germany, Aug. 7-11, 2005, Association for Computing Machinery, New York, Aug. 7, 2005 (Aug. 7, 2005), pp. 625-632, XP058203964, DOI: 10.1145/1102351.11 024301SBN: 978-1-59593-180-1.
Hu W., et al., "Online Adaboost-Based Parameterized Methods for Dynamic Distributed Network Intrusion Detection", IEEE Transactions on Cybernetics, vol. 44, No. 1, Mar. 27, 2013 (Mar. 27, 2013), pp. 66-82, XP011533908, DOI: 10.1109/TCYB.2013.2247592.
Jean E., et al., "Addressing Mobile Agent Security Through Agent Collaboration", Journal of Information Processing Systems, vol. 3, No. 2, Dec. 2007 (Dec. 2007), pp. 43-53, XP055341844, DOI: 10.3745/JIPS.2008.3.2.043.

\* cited by examiner

COMMUNICATING BEHAVIOR INFORMATION IN A MOBILE COMPUTING DEVICE

RELATED APPLICATIONS

This application claims the benefit of priority to U.S. Provisional Patent Application No. 61/752,144 entitled "Devices and Methods of Communicating Behavior Information in a Client-Cloud Architecture" filed Jan. 14, 2013; U.S. Provisional Patent Application No. 61/646,590 entitled "System, Apparatus and Method for Adaptive Observation of Mobile Device Behavior" filed May 14, 2012; and U.S. Provisional Application No. 61/683,274, entitled "System, Apparatus and Method for Adaptive Observation of Mobile Device Behavior" filed Aug. 15, 2012, the entire contents of all of which are hereby incorporated by reference for all purposes.

BACKGROUND

Cellular and wireless communication technologies have seen explosive growth over the past several years. This growth has been fueled by better communications hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of communicating behavior-analysis information between modules of a mobile device by exchanging information regarding behavior features observed in the mobile device between a first module and a second module of the mobile device via an application programming interface, the exchanged information including behavior features used by one of the first module and the second module to determine whether a mobile device behavior is benign or not benign. In an aspect, the method may include receiving a first list of behavior features to be observed in the first module, identifying behavior features included in the received first list that are best features for enabling a mobile device processor to determine whether the mobile device behavior is benign or not benign, generating a second list of behavior features that may include the best features for enabling the mobile device processor to conclusively determine whether the mobile device behavior is benign or not benign, and sending the second list of behavior features to the second module via the application programming interface.

In a further aspect, the method may include receiving via the application programming interface a request for actuation that may include a command suitable for causing the mobile device to notify a mobile device user, block a process, or terminate the process. In a further aspect, the method may include receiving via the application programming interface a request for a behavior log that identifies one of a granularity level, a specific application, a duration or period of time, a process, and a priority. In a further aspect, the method may include generating the behavior log to include information collected based on an analysis of one of the mobile device behavior, the specific application, and the process.

Further aspects include a mobile computing device having a processor, and means for exchanging information regarding behavior features observed in the mobile device between a first module and a second module of the mobile device via an application programming interface, the exchanged information including behavior features used by one of the first module and the second module to determine whether a mobile device behavior is benign or not benign. In an aspect, the mobile computing device may include means for receiving a first list of behavior features to be observed in the first module, means for identifying behavior features included in the received first list that are best features for conclusively determining whether the mobile device behavior is benign or not benign, means for generating a second list of behavior features that may include the best features for conclusively determining whether the mobile device behavior is benign or not benign, and means for sending the second list of behavior features to the second module via the application programming interface.

In a further aspect, the mobile computing device may include means for receiving via the application programming interface a request for actuation that may include a command suitable for causing the mobile device to notify a mobile device user, block a process, or terminate the process. In a further aspect, the mobile computing device may include means for receiving via the application programming interface a request for a behavior log that identifies one of a granularity level, a specific application, a duration or period of time, a process, and a priority. In a further aspect, the mobile computing device may include means for generating the behavior log to include information collected based on an analysis of one of the mobile device behavior, the specific application, and the process.

Further aspects include a mobile computing device having a transceiver, a memory, and a processor coupled to the transceiver and the memory and configured with processor-executable instructions to perform operations for exchanging information regarding behavior features observed in the mobile device between a first module and a second module of the mobile device via an application programming interface, the exchanged information including behavior features used by one of the first module and the second module to determine whether a mobile device behavior is benign or not benign.

In an aspect, the processor may be configured with processor-executable instructions to perform operations further including receiving a first list of behavior features to be observed in the first module, identifying behavior features included in the received first list that are best features for conclusively determining whether the mobile device behavior is benign or not benign, generating a second list of behavior features that may include the best features for conclusively determining whether the mobile device behavior is benign or not benign, and sending the second list of behavior features to the second module via the application programming interface.

In a further aspect, the processor may be configured with processor-executable instructions to perform operations further including receiving via the application programming interface a request for actuation that may include a command suitable for causing the mobile device to notify a mobile device user, block a process, or terminate the process. In a further aspect, the processor may be configured with processor-executable instructions to perform operations further including receiving via the application programming interface a request for a behavior log that identifies one of a granularity level, a specific application, a duration or period of time, a process, and a priority. In a further aspect, the processor may be configured with processor-executable instructions to perform operations further including generating the behavior log to include information collected based on an analysis of one of the mobile device behavior, the specific application, and the process.

Further aspects include a non-transitory computer-readable storage medium having stored thereon processor-executable instructions configured cause a mobile device processor to perform operations for communicating behavior-analysis information between modules of a mobile device, the operations including exchanging information regarding behavior features observed in the mobile device between a first module and a second module of the mobile device via an application programming interface, the exchanged information including behavior features used by one of the first module and the second module to determine whether a mobile device behavior is benign or not benign.

In an aspect, the stored processor-executable software instructions may be configured to cause the mobile device processor to perform operations further including receiving a first list of behavior features to be observed in the first module, identifying behavior features included in the received first list that are best features for conclusively determining whether the mobile device behavior is benign or not benign, generating a second list of behavior features that may include the best features for enabling the mobile device processor to conclusively determine whether the mobile device behavior is benign or not benign, and sending the second list of behavior features to the second module via the application programming interface.

In a further aspect, the stored processor-executable software instructions may be configured to cause the mobile device processor to perform operations further including receiving via the application programming interface a request for actuation that may include a command suitable for causing the mobile device to notify a mobile device user, block a process, or terminate the process. In a further aspect, the stored processor-executable software instructions may be configured to cause the mobile device processor to perform operations further including receiving via the application programming interface a request for a behavior log that identifies one of a granularity level, a specific application, a duration or period of time, a process, and a priority. In a further aspect, the stored processor-executable software instructions may be configured to cause the mobile device processor to perform operations further including generating the behavior log to include information collected based on an analysis of one of the mobile device behavior, the specific application, and the process.

The various aspects also include methods of communicating behavior-analysis information in a mobile device using an application programming interface, which may include receiving via the application programming interface a targeted behavior model that identifies factors and data points most relevant to conclusively determining whether a mobile device behavior is benign or not benign. In an aspect, receiving the targeted behavior model may include receiving an XML file. In a further aspect, the method may include receiving a finite state machine representation that may include a mapping of features to behavior classifications in a first module of the mobile device.

In a further aspect, the method may include receiving via the application programming interface a request for actuation that may include a command suitable for causing the mobile device to notify a mobile device user, block a process, or terminate the process. In a further aspect, the method may include receiving via the application programming interface a request for a behavior log that identifies one of a granularity level, a specific application, a duration or period of time, a process, and a priority. In a further aspect, the method may include generating the behavior log to include information collected based on an analysis of one of the mobile device behavior, the specific application, and the process. In a further aspect, the method may include receiving via the application programming interface an updated behavior model that identifies factors and data points most relevant to conclusively determining whether the mobile device behavior is benign or not benign.

Further aspects include a computing device having a processor, and means for receiving via an application programming interface a targeted behavior model that identifies factors and data points most relevant conclusively determining whether a mobile device behavior is benign or not benign. In an aspect, the means for receiving the targeted behavior model may include means for receiving an XML file.

In a further aspect, the computing device may include means for receiving a finite state machine representation that may include a mapping of features to behavior classifications in a first module of the mobile device. In a further aspect, the computing device may include means for receiving via the application programming interface a request for actuation that may include a command suitable for causing the mobile device to notify a mobile device user, block a process, or terminate the process. In a further aspect, the computing device may include means for receiving via the application programming interface a request for a behavior log that identifies one of a granularity level, a specific application, a duration or period of time, a process, and a priority. In a further aspect, the computing device may include means for generating the behavior log to include information collected based on an analysis of one of the mobile device behavior, the specific application, and the process. In a further aspect, the computing device may include means for receiving via the application programming interface an updated behavior model that identifies factors and data points most relevant to conclusively determining whether the mobile device behavior is benign or not benign.

Further aspects include a mobile computing device having a transceiver, a memory, and a processor coupled to the transceiver and the memory and configured with processor-executable instructions to perform operations that include receiving via an application programming interface a targeted behavior model that identifies factors and data points most relevant to conclusively determining whether a mobile device behavior is benign or not benign. In an aspect, the processor may be configured with processor-executable instructions to perform operations such that receiving the targeted behavior model may include receiving an XML file.

In a further aspect, the processor may be configured with processor-executable instructions to perform operations further including receiving a finite state machine representation that includes a mapping of features to behavior classifications in a first module of the mobile device. In a further aspect, the processor may be configured with processor-executable instructions to perform operations further including receiving via the application programming interface a request for actuation that may include a command suitable for causing the mobile device to notify a mobile device user, block a process, or terminate the process. In a further aspect, the processor may be configured with processor-executable instructions to perform operations further including receiving via the application programming interface a request for a behavior log that identifies one of a granularity level, a specific application, a duration or period of time, a process, and a priority.

In a further aspect, the processor may be configured with processor-executable instructions to perform operations further including generating the behavior log to include information collected based on an analysis of one of the mobile device behavior, the specific application, and the process. In a further aspect, the processor may be configured with processor-executable instructions to perform operations further including receiving via the application programming interface an updated behavior model that identifies factors and data points most relevant to conclusively determining whether the mobile device behavior is benign or not benign.

Further aspects include a non-transitory computer readable storage medium having stored thereon processor-executable software instructions configured to cause a mobile device processor to perform operations for communicating behavior-analysis information in a mobile device using an application programming interface, the operations including receiving via the application programming interface a targeted behavior model that identifies factors and data points most relevant to enabling the mobile device processor to conclusively determine whether a mobile device behavior is benign or not benign. In an aspect, the stored processor-executable software instructions may be configured to cause the mobile device processor to perform operations such that receiving the targeted behavior model may include receiving an XML file. In a further aspect, the stored processor-executable software instructions may be configured to cause the mobile device processor to perform operations further including receiving a finite state machine representation that may include a mapping of features to behavior classifications in a first module of the mobile device.

In a further aspect, the stored processor-executable software instructions may be configured to cause the mobile device processor to perform operations further including receiving via the application programming interface a request for actuation that may include a command suitable for causing the mobile device to notify a mobile device user, block a process, or terminate the process. In a further aspect, the stored processor-executable software instructions may be configured to cause the mobile device processor to perform operations further including receiving via the application programming interface a request for a behavior log that identifies one of a granularity level, a specific application, a duration or period of time, a process, and a priority.

In a further aspect, the stored processor-executable software instructions may be configured to cause the mobile device processor to perform operations further including generating the behavior log to include information collected based on an analysis of one of the mobile device behavior, the specific application, and the process. In a further aspect, the stored processor-executable software instructions may be configured to cause the mobile device processor to perform operations further including receiving via the application programming interface an updated behavior model that identifies factors and data points most relevant to enabling the mobile device processor to conclusively determine whether the mobile device behavior is benign or not benign.

The various aspects also include methods of communicating behavior-analysis information with a third-party server in a client-cloud communication system using an application programming interface, which may include receiving in a processor of a mobile device from the third-party server via the application programming interface a first list of behavior features to be observed, identifying behavior features included in the received first list that are best features for enabling a mobile device processor to conclusively determine whether a mobile device behavior is benign or not benign, generating a second list of behavior features that includes the identified best features for enabling the mobile device processor to conclusively determine whether the mobile device behavior is malicious or benign, sending the second list of behavior features to the third-party server via the application programming interface, and receiving via the application programming interface a finite state machine representation that includes a mapping of features to behavior classifications suitable for use by the mobile device processor in determining whether the mobile device behavior is benign or not benign. In an aspect, receiving the first list of behavior features to be observed includes receiving an XML file via the application programming interface.

In a further aspect, the method may include receiving via the application programming interface a request for actuation that includes a command suitable for causing the mobile device to notify a mobile device user, block a process, or terminate the process. In a further aspect, the method may include receiving via the application programming interface a request for a behavior log that identifies one of a granularity level, a specific application, a duration or period of time, a process, and a priority. In a further aspect, the method may include generating the behavior log to include information collected based on an analysis of one of the mobile device behavior, the specific application, and the process.

Further aspects include a computing device that includes a processor, and means for receiving via an application programming interface a first list of behavior features to be observed on the mobile device from a third-party server, means for identifying behavior features included in the received first list that are best features for enabling the processor to conclusively determine whether a mobile device behavior is benign or not benign, means for generating a second list of behavior features that includes the identified best features for enabling the processor to conclusively determine whether the mobile device behavior is malicious or benign, means for sending the second list of behavior features to the third-party server via the application programming interface, and means for receiving via the application programming interface a finite state machine representation that includes a mapping of features to behavior classifications suitable for use by the processor in determining whether the mobile device behavior is benign or not benign. In an aspect, the means for receiving via the application programming interface the first list of behavior features to be observed includes means for receiving an XML file via the application programming interface. In a further aspect, the computing device includes means for receiving via the application programming interface a request for actuation that includes a command suitable for causing the mobile device to notify a mobile device user, block a process, or terminate the process.

In a further aspect, the computing device may include means for receiving via the application programming interface a request for a behavior log that identifies one of a granularity level, a specific application, a duration or period of time, a process, and a priority. In a further aspect, the computing device includes means for generating the behavior log to include information collected based on an analysis of one of the mobile device behavior, the specific application, and the process.

Further aspects include a mobile device having a transceiver, a memory, and a processor coupled to the transceiver and the memory, in which the processor may be configured with processor-executable instructions to perform operations including receiving from a third-party server via an application programming interface a first list of behavior features to be observed, identifying behavior features included in the received first list that are best features for conclusively determining whether a mobile device behavior is benign or not benign, generating a second list of behavior features that includes the identified best features for conclusively determining whether the mobile device behavior is malicious or benign, sending the second list of behavior features to the third-party server via the application programming interface, and receiving via the application programming interface a finite state machine representation that includes a mapping of features to behavior classifications suitable for use in determining whether the mobile device behavior is benign or not benign. In an aspect, the processor may be configured with processor-executable instructions to perform operations such that receiving via the application programming interface the first list of behavior features to be observed includes receiving an XML file via the application programming interface.

In a further aspect, the processor may be configured with processor-executable instructions to perform operations further including receiving via the application programming interface a request for actuation that includes a command suitable for causing the mobile device to notify a mobile device user, block a process, or terminate the process. In a further aspect, the processor may be configured with processor-executable instructions to perform operations further including receiving via the application programming interface a request for a behavior log that identifies one of a granularity level, a specific application, a duration or period of time, a process, and a priority. In a further aspect, the processor may be configured with processor-executable instructions to perform operations further including generating the behavior log to include information collected based on an analysis of one of the mobile device behavior, the specific application, and the process.

Further aspects include a non-transitory computer readable storage medium having stored thereon processor-executable software instructions configured to cause a mobile device processor to perform operations for communicating behavior-analysis information with a third-party server in a client-cloud communication system using an application programming interface, the operations including receiving from the third-party server via the application programming interface a first list of behavior features to be observed, identifying behavior features included in the received first list that are best features for conclusively determining whether a mobile device behavior is benign or not benign, generating a second list of behavior features that includes the identified best features for conclusively determining whether the mobile device behavior is malicious or benign, sending the second list of behavior features to the third-party server via the application programming interface, and receiving via the application programming interface a finite state machine representation that includes a mapping of features to behavior classifications suitable for use in determining whether the mobile device behavior is benign or not benign.

In an aspect, the stored processor-executable software instructions may be configured to cause the mobile device processor to perform operations such that receiving via the application programming interface the first list of behavior features to be observed includes receiving an XML file via the application programming interface. In a further aspect, the stored processor-executable software instructions may be configured to cause the mobile device processor to perform operations further including receiving via the application programming interface a request for actuation that includes a command suitable for causing the mobile device processor to notify a mobile device user, block a process, or terminate the process. In a further aspect, the stored processor-executable software instructions may be configured to cause the mobile device processor to perform operations further including receiving via the application programming interface a request for a behavior log that identifies one of a granularity level, a specific application, a duration or period of time, a process, and a priority. In a further aspect, the stored processor-executable software instructions may be configured to cause the mobile device processor to perform operations further including generating the behavior log to include information collected based on an analysis of one of the mobile device behavior, the specific application, and the process.

The various aspects further include methods of communicating behavior-analysis information with a third-party server in a client-cloud communication system using an application programming interface, which may include receiving in a processor of a mobile device from the third-party server via the application programming interface a first list of behavior features to be observed, identifying behavior features included in the received first list that are best features for enabling a mobile device processor to conclusively determine whether a mobile device behavior is benign or not benign, generating a second list of behavior features that includes the identified best features for enabling the mobile device processor to conclusively determine whether the mobile device behavior is benign or not benign, sending the second list of behavior features to the third-party server via the application programming interface, and receiving via the application programming interface a targeted behavior model that identifies factors and data points most relevant to enabling the mobile device processor to conclusively determine whether the mobile device behavior is benign or not benign.

In an aspect, receiving via the application programming interface the first list of behavior features to be observed includes receiving an XML file via the application programming interface. In a further aspect, receiving via the application programming interface the targeted behavior model includes receiving via the application programming interface a finite state machine representation that includes a mapping of features to behavior classifications. In a further aspect, the method may include receiving via the application programming interface a request for actuation that includes a command suitable for causing the mobile device to notify a mobile device user, block a process, or terminate the process.

In a further aspect, the method may include receiving via the application programming interface a request for a behavior log that identifies one of a granularity level, a specific application, a duration or period of time, a process, and a priority. In a further aspect, the method may include generating the behavior log to include information collected based on an analysis of one of the mobile device behavior, the specific application, and the process.

Further aspects include a computing device having a processor, means for receiving via the application programming interface a first list of behavior features to be observed on the mobile device from a third-party server, means for identifying behavior features included in the received first list that are best features for enabling the processor to conclusively determine whether a mobile device behavior is benign or not benign, means for generating a second list of behavior features that includes the identified best features for enabling the processor to conclusively determine whether the mobile device behavior is benign or not benign, means for sending the second list of behavior features to the third-party server via the application programming interface, and means for receiving via the application programming interface a targeted behavior model that identifies factors and data points most relevant to the processor to conclusively determine whether the mobile device behavior is benign or not benign.

In an aspect, the means for receiving via the application programming interface the first list of behavior features to be observed may include means for receiving an XML file via the application programming interface. In a further aspect, the means for receiving via the application programming interface the targeted behavior model may include means for receiving via the application programming interface a finite state machine representation that includes a mapping of features to behavior classifications. In a further aspect, the computing device may include means for receiving via the application programming interface a request for actuation that includes a command suitable for causing the mobile device to notify a mobile device user, block a process, or terminate the process. In a further aspect, the computing device may include means for receiving via the application programming interface a request for a behavior log that identifies one of a granularity level, a specific application, a duration or period of time, a process, and a priority. In a further aspect, the computing device may include means for generating the behavior log to include information collected based on an analysis of one of the mobile device behavior, the specific application, and the process.

Further aspects include a mobile device, including a transceiver, a memory, and a processor coupled to the transceiver and the memory, in which the processor may be configured with processor-executable instructions to perform operations including receiving from a third-party server via an application programming interface a first list of behavior features to be observed, identifying behavior features included in the received first list that are best features for determining whether a mobile device behavior is benign or not benign, generating a second list of behavior features that includes the identified best features for determining whether the mobile device behavior is benign or not benign, sending the second list of behavior features to the third-party server via the application programming interface, and receiving via the application programming interface a targeted behavior model that identifies factors and data points most relevant to determining whether the mobile device behavior is benign or not benign.

In an aspect, the processor may be configured with processor-executable instructions to perform operations such that receiving via the application programming interface the first list of behavior features to be observed includes receiving an XML file via the application programming interface. In a further aspect, the processor may be configured with processor-executable instructions to perform operations such that receiving via the application programming interface the targeted behavior model includes receiving via the application programming interface a finite state machine representation that includes a mapping of features to behavior classifications. In a further aspect, the processor may be configured with processor-executable instructions to perform operations further including receiving via the application programming interface a request for actuation that includes a command suitable for causing the mobile device to notify a mobile device user, block a process, or terminate the process.

In a further aspect, the processor may be configured with processor-executable instructions to perform operations further including receiving via the application programming interface a request for a behavior log that identifies one of a granularity level, a specific application, a duration or period of time, a process, and a priority. In a further aspect, the processor may be configured with processor-executable instructions to perform operations further including generating the behavior log to include information collected based on an analysis of one of the mobile device behavior, the specific application, and the process.

Further aspects include a non-transitory computer readable storage medium having stored thereon processor-executable software instructions configured to cause a mobile device processor to perform operations for communicating behavior-analysis information with a third-party server in a client-cloud communication system using an application programming interface, the operations including receiving from the third-party server via the application programming interface a first list of behavior features to be observed, identifying behavior features included in the received first list that are best features for determining whether a mobile device behavior is benign or not benign, generating a second list of behavior features that includes the identified best features for determining whether the mobile device behavior is benign or not benign, sending the second list of behavior features to the third-party server via the application programming interface, and receiving via the application programming interface a targeted behavior model that identifies factors and data points most relevant to determining whether the mobile device behavior is benign or not benign.

In an aspect, the stored processor-executable software instructions may be configured to cause the mobile device processor to perform operations such that receiving via the application programming interface the first list of behavior features to be observed includes receiving an XML file via the application programming interface. In a further aspect, the stored processor-executable software instructions may be configured to cause the mobile device processor to perform operations such that receiving via the application programming interface the targeted behavior model includes receiving via the application programming interface a finite state machine representation that includes a mapping of features to behavior classifications. In a further aspect, the stored processor-executable software instructions may be configured to cause the mobile device processor to perform operations further including receiving via the application programming interface a request for actuation that includes a command suitable for causing the mobile device processor to notify a mobile device user, block a process, or terminate the process.

In a further aspect, the stored processor-executable software instructions may be configured to cause the mobile device processor to perform operations further including receiving via the application programming interface a request for a behavior log that identifies one of a granularity level, a specific application, a duration or period of time, a process, and a priority. In a further aspect, the stored processor-executable software instructions may be configured to cause the mobile device processor to perform operations further including generating the behavior log to include information collected based on an analysis of one of the mobile device behavior, the specific application, and the process.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
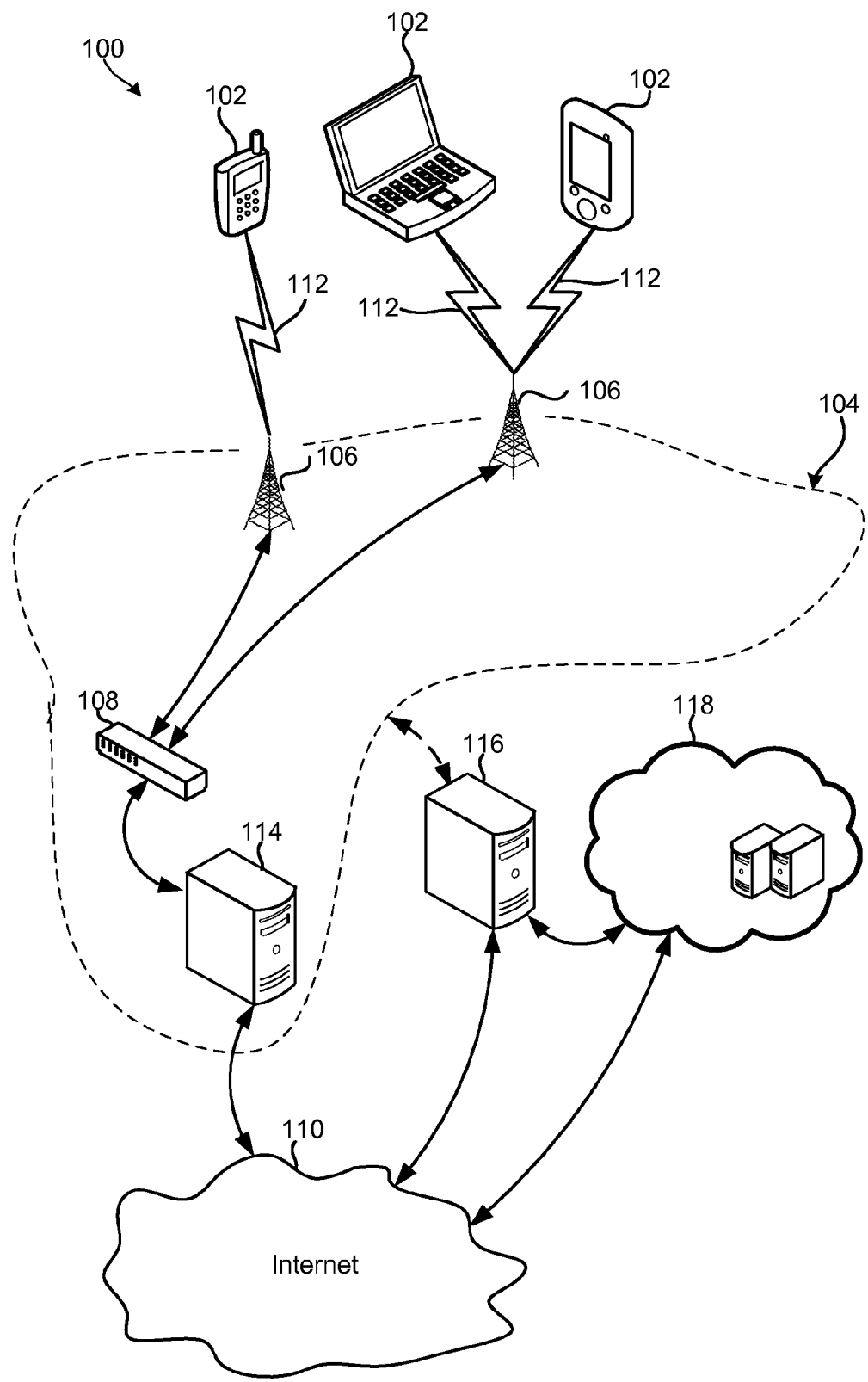
FIG. 1 is a communication system block diagram illustrating network components of an example telecommunication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The various aspects provide mobile devices, systems, and methods for efficiently identifying, classifying, modeling, preventing, and/or correcting the conditions and/or mobile device behaviors that often degrade a mobile computing device's performance, power utilization levels, network usage levels, security and/or privacy over time. The use of an aspect behavior application programming interface (APIs) and related modules on the mobile device facilitates the communication of information on such conditions and behaviors between various modules of the mobile device and third-party servers. Such third-party servers may be maintained by one or more partner companies that have domain expertise in a particular area or technology that is relevant for identifying, analyzing, classifying, and/or reacting to mobile device behaviors, but that do not have access to (or knowledge of) the various mobile device sub-systems, interfaces, configurations, modules, processes, drivers, and/or hardware systems required to generate effective data or behavior models suitable for use by the mobile device. The aspect behavior APIs and modules allow the third-party server to directly invoke, control, or access the behavior observation and analysis operations of the mobile device. The aspect behavior APIs and modules allow the third-party server to quickly and efficiently access the most relevant and important information on the mobile device so that the third-party server may focus its operations on generating precise behavior models. The aspect behavior APIs and modules facilitate communications and interactions between mobile devices and third parties to enable the mobile devices to react to performance-limiting and undesirable operating conditions much faster and with lower power consumption than if all such analyses and operations were accomplished independently within each mobile device.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, internet-of-things (IOT) connected devices, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

The terms "telecommunications network operator," "network operator," and "service provider" may be used interchangeably to refer to any entity or network suitable for providing consumers with access to the Internet or Internet Protocol (IP) data, communications, or other services over a telecommunication network.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems, and there are a large variety of factors that may contribute to the degradation in performance and power utilization levels of a mobile device over time, including poorly designed software applications, malware, viruses, fragmented memory, background processes, etc. Due to the number, variety, and complexity of these factors, it is often not feasible to evaluate all the factors that may contribute to the degradation in performance and/or power utilization levels of the complex yet resource-constrained systems of modern mobile devices.

To provide better performance in view of these facts, the various aspects include mobile devices that include behavior monitoring and analysis modules configured to work in conjunction with private third-party servers (e.g., anti-virus partners, security partners, OEMs, etc.) to intelligently and efficiently identify factors that may contribute to the degradation in performance and power utilization levels of mobile devices over time. By providing aspect behavior application programming interfaces (API) and client modules that facilitate communications between the behavior monitoring and analysis modules of the mobile device and third-party servers, the various aspects enable the mobile device to identify and react to performance-limiting and undesirable operating conditions much faster and/or with lower power consumption than when all such analyses were to be accomplished independently within the mobile device.

In an aspect, an observer process, daemon, module, or sub-system (herein collectively referred to as a "module") of the mobile device may instrument or coordinate various application programming interfaces (APIs) at various levels of the mobile device system, and collect behavior information from the instrumented APIs. The observer module may constantly monitor the mobile device (via a low power process, background processes, etc.) to identify the normal operation patterns of the mobile device and/or to identify behaviors that are not consistent with previously computed normal operation patterns. The observer module may communicate (e.g., via a memory write operation, function call, etc.) the collected behavior information to the analyzer module (e.g., via a memory write operation, etc.) of the mobile device, which may analyze and/or classify the collected behavior information, generate behavior vectors, generate spatial and/or temporal correlations based on the behavior vector and information collected from various other mobile device sub-systems, and determine whether a particular mobile device behavior, software application, or process is benign, suspicious, malicious, or performance-degrading.

The analyzer module of the mobile device may be configured to perform real-time analysis operations, which may include performing, executing, and/or applying data, algorithms, and/or models (herein collectively "models") to real time behavior information collected by the observer module to determine whether a mobile device behavior is benign, suspicious, malicious, or performance-degrading. Likewise, the observer module may apply similar models to determine which factors or mobile device behaviors to observe and/or the level of detail at which the factors or mobile device behaviors are to be observed. In the various aspects, the models applied by observer and analyzer modules may be classifiers, models of power consumption provided by the OEM, models of network traffic usage provided by network operators, models of malicious activity provided by a security partner, reduced feature models (RFMs), etc., any or all of which may be pre-installed on the mobile device, generated on the mobile device, and/or downloaded from third-party network servers.

In an aspect, the mobile device may include behavior API and/or client modules that allow the mobile device to download data/behavior models from a third-party network server. That is, the behavior API and/or client modules may be configured to facilitate the communication of information between the behavior monitoring and analysis modules of the mobile device and third-party servers. The third-party servers may be maintained by partner companies that have domain expertise in a particular area or technology that is relevant for identifying, analyzing, classifying, and/or reacting to mobile device behaviors, but that do not have access to (or knowledge of) the various mobile device sub-systems, interfaces, configurations, modules, processes, drivers, and/or hardware systems required to generate effective data/behavior models suitable for use by the mobile device.

For example, in an aspect, the behavior API and/or client modules may be configured to allow the analyzer module to receive behavior models from a third-party antivirus server that is in a different network and/or maintained by an independent antivirus company, and apply the received behavior models to classify the mobile device behavior benign or malicious behavior. As another example, the analyzer module may receive behavior models received from a third-party server maintained by a telecommunications network operator to classify the mobile device's network usage as being normal or below average. As yet another example, the analyzer module may receive behavior models from a third-party server maintained by an original equipment manufacturer (OEM) of the mobile device to classify the mobile device's power or battery consumption as being average or below average, etc.

In an aspect, the behavior API and/or client modules may be configured to enable a mobile device to receive commands or instructions from a third-party server and perform corrective or preventive actuation actions or operations in response to receiving the commands/instructions.

In an aspect, the behavior API and/or client modules may be configured to allow the third-party server to quickly and efficiently access the most relevant and important information on the mobile device so that the third-party server may focus its operations on generating precise or more accurate models.

In an aspect, the behavior API and/or client modules may be configured to allow the third-party server to provide the mobile device with computational offloading, crowd sourcing, and other services that enable the mobile device to identify performance-degrading factors on the mobile device without consuming an excessive amount of processing, memory, or energy resources of the mobile device.

In various aspects, the behavior API and/or client modules may be configured to allow the third-party server to: discover the capabilities of the mobile device; perform client registration and authentication operations on the device; access a list of mobile device behaviors or features that are to be observed on the mobile device; access a finite state machine description of a mapping of features to benign, suspicious, or malicious/performance-degrading behaviors; issue requests for additional, more detailed, or more targeted observations of mobile device behaviors; issue requests to back-off from observing one or more factors, applications or behaviors that are currently being observed (e.g., a white list) by the mobile device; issue requests for behavior logs (good, bad, suspicious, etc.); issue requests for actuation to the mobile device; initiate a corrective action on the mobile device; and/or perform other similar operations on or for the mobile device.

In an aspect, the behavior API and/or client modules may be configured to send behavior vectors, the results of the real-time analysis operations performed on the mobile device, behavior logs generated by the mobile device, and other behavior analysis information and computations to the third-party server. Such feedback communications between the mobile device and third-party server may allow the third-party server to perform deeper analysis of the mobile device behaviors, reevaluate the effectiveness of its data/behavior models and/or generate new data/behavior models that include the most current, relevant and/or precise information.

In an aspect, the behavior API and/or client modules may allow a third-party server to repeatedly, continuously, or periodically reevaluate existing data/behavior models as new behavior/analysis reports are received from the mobile devices. The third-party server may generate new or updated data/behavior models based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc., and send the new/updated models to one or more mobile devices for use in monitoring their respective behaviors for potential performance degradation behaviors.

In an aspect, the behavior API and/or client modules may allow a third-party server to generate or update behavior models by performing, executing, or applying machine learning and/or context modeling techniques to behavior information and/or results of behavior analyses received from many mobile devices. That is, the third-party server may receive a large number of reports from many mobile devices via their respective behavior API and/or client modules, and analyze, consolidate, or otherwise turn such crowd-sourced information into useable information, such as focused behavior models that can be used or accessed by many mobile devices.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 116 connected to the telephone network 104 and to the Internet 110. Each network server 116 may be a third-party server that is maintained by a partner company that has domain expertise in a particular area or technology that is relevant for identifying, analyzing, classifying, and/or reacting to mobile device behaviors, but does not have access to (or knowledge of) the various mobile device sub-systems, interfaces, configurations, modules, processes, drivers, and/or hardware systems required to generate effective data or behavior models suitable for use by the mobile device 102. In an aspect, the network server 116 may be implemented as a server within the network infrastructure of a cloud service provider network 118. The connection between the network server 116 and the telephone network 104 may be through the Internet 110 or through a private network (as illustrated by the dashed arrows). Communication between the network server 116 and the mobile devices 102 may be achieved through the telephone network 104, the internet 110, private network (not illustrated), or any combination thereof.

The network server 116 may send data/behavior models to the mobile device 102, which may receive and use the data/behavior models to identify suspicious or performance-degrading mobile device behaviors, software applications, processes, etc. The network server 116 may also send instructions or commands to the mobile device 102. The network server 116 may also send classification and modeling information to the mobile devices 102 to replace, update, create and/or maintain mobile device data/behavior models.

The mobile device 102 may collect behavioral, state, classification, modeling, success rate, and/or statistical information in the mobile device 102, and send the collected information to the network server 116 (e.g., via the telephone network 104) for analysis. The network server 116 may use information received from the mobile device 102 to update or refine the lean data/behavior models or the classification/modeling information to include a targeted subset of features.

Figure 2:
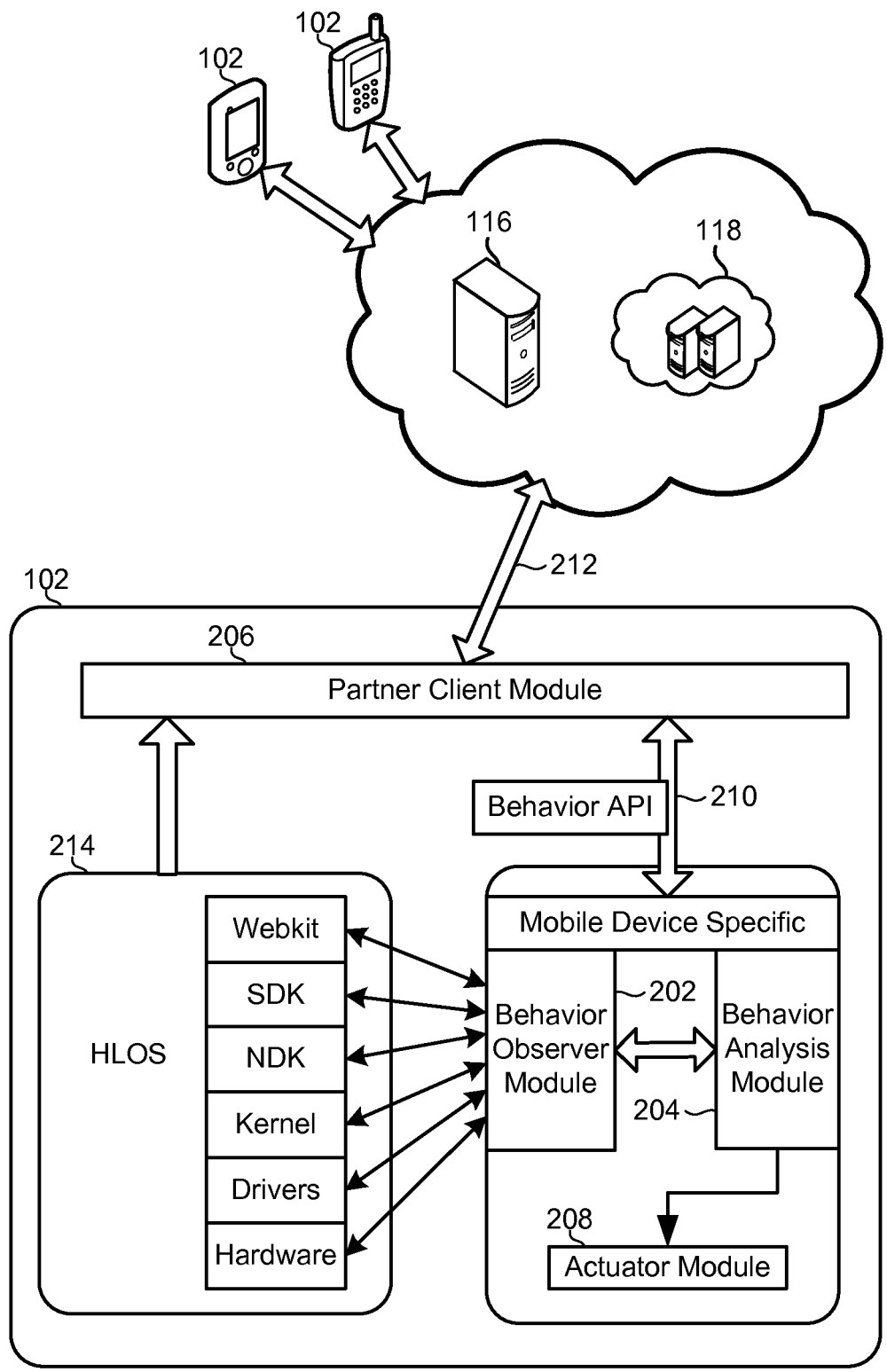
FIG. 2 is a block diagram illustrating example logical components and information flows in an aspect mobile device configured to communicate with a third-party server to determine whether a particular mobile device behavior, software application, or process is performance-degrading, suspicious, or benign.

FIG. 2 illustrates example logical components and information flows in an aspect mobile device 102 configured to determine whether behaviors, software applications, and/or processes are malicious, performance-degrading, suspicious, or benign. In the example illustrated in FIG. 2, the mobile device 102 includes a high level operating system 214, a behavior observer module 202, a behavior analyzer module 204, a partner client module 206, an actuator module 208, and a behavior API module 210. Each of the modules 202-210 may be implemented in software, hardware, or any combination thereof. In various aspects, the modules 202-210 may be implemented within parts of a high-level operating system 214 (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 102.

The behavior observer module 202 may be configured to perform cross-layer observations on various mobile device modules and sub-systems encompassing webkit, SDK, NDK, kernel, drivers, and hardware in order to characterize the mobile device behavior.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 204.

The behavior observer module 202 may monitor/observe mobile device operations and events by collecting information pertaining to library API calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the number or degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device. The behavior observer module 202 may also monitor/observe actions or operations of software applications, mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may monitor/observe usage of and updates/changes to compass information, mobile device settings, battery life, gyroscope information, pressure sensors, magnet sensors, screen activity, etc.

The behavior observer module 202 may monitor/observe notifications communicated to and from a software application (AppNotifications), application updates, etc.

The behavior observer module 202 may monitor/observe conditions or events pertaining to a first software application or module requesting the downloading and/or install of a second software application.

The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level.

Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensors to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc.

Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors to be monitored from a third-party network server 116 and/or a component in a cloud service or network 118 via the partner client module 206 and/or behavior module API 214. In an aspect, the initial set of behaviors/factors to be monitored may be specified in data/behavior models received from the network server 116 or cloud service/network 118.

The behavior analyzer module 204 may receive the observations from the behavior observer module 202, compare the received information (i.e., observations) with contextual information received from an external context information module, and identify subsystems, processes, and/or applications associated with the received observations that are contributing to (or are likely to contribute to) the device's degradation over time, or which may otherwise cause problems on the device. Similarly, the behavior analyzer module 204 may receive the observations and/or additional information from a third-party network server 116 and/or a component in a cloud service or network 118 via the partner client 206 module, compare the received information (i.e., observations) with contextual information received from an external context information module, and identify subsystems, processes, and/or applications associated with the received observations that are contributing to (or are likely to contribute to) the device's degradation over time, or which may otherwise cause problems on the device.

In an aspect, the behavior analyzer module 204 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, partner client 206 module, etc.), learn the normal operational behaviors of the mobile device, and generate one or more behavior vectors based the results of the comparisons. The behavior analyzer module 204 may generate and/or receive behavior vectors and compare them to one or more behavior modules to determine whether a particular mobile device behavior, software application, or process is performance-degrading/malicious, benign, or suspicious.

When the behavior analyzer module 204 determines that a behavior, software application, or process is malicious or performance-degrading, the behavior analyzer module 204 may notify the actuator module 208, which may perform various actions or operations to correct mobile device behaviors determined to be malicious or performance-degrading and/or perform operations to notify the user, or to heal, cure, isolate, or otherwise fix the identified problem.

When the behavior analyzer module 204 determines that a behavior, software application, or process is suspicious, the behavior analyzer module 204 may notify the behavior observer module 202, which may adjust the adjust the granularity of its observations (i.e., the level of detail at which mobile device behaviors are observed) and/or change the behaviors that are observed based on information received from the analyzer module 204 (e.g., results of the real-time analysis operations), generate or collect new or additional behavior information, and send the new/additional information to the behavior analyzer module 204 for further analysis/classification. Such feedback communications between the behavior observer module 202 and the behavior analyzer module 204 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity.

In an aspect, when the behavior analyzer module 204 determines that a behavior, software application, or process is suspicious, the behavior analyzer module 204 may notify the partner client 206 module via the behavior API 214. The partner client 206 module may format and send the behavior information to the network server 116 and/or a component in a cloud service or network 118 for further analysis and use in generating future models. In an aspect, the behavior information may be formatted as a behavior vector that is sent to the network server 116. In an aspect, the partner client 206 module may send the behavior vector information to the network server 116 and/or a component in a cloud service or network 118 when the analyzer module 204 determines that addition information may be required, such as when it cannot conclusively determine whether a mobile device behavior is performance-degrading/malicious or benign. In an aspect, the partner client 206 module may send the behavior information or behavior vector to the network server 116 and/or a component in a cloud service or network 118 using a client-server interface 212.

In various aspects, the partner client 206 module may be configured to allow a third-party network server 116 to interact with behavior observer and analyzer modules 202, 204 in mobile devices 102 via the behavior API 214. Communicating with the partner client 206 module on the mobile device 102 via the behavior API 214 module, a third-party network server 116 may perform operations to: discover the capabilities of the mobile device; perform client registration and authentication operations on the device; access a list of mobile device behaviors or features that may be observed/analyzed in the mobile device; generate, populate, and/or update a finite state machine description of a mapping of features to benign, suspicious, or malicious/performance-degrading behaviors; issue requests for additional, more detailed, or more targeted observations of mobile device behaviors; issue requests to back-off from observing specific applications (e.g., a white list); issue requests to receive behavior logs (good, bad, suspicious, etc.); issue requests that cause the mobile device to initiate a corrective action (e.g., via the actuation module 208); and/or perform other similar operations in the mobile device.

The partner client 206 module may store (or have access to a database or server that stores) collaboration information and/or data-structures suitable for interpreting behavior information communicated between the behavior observer module 202, behavior analyzer module 204, a network server 116, and/or a component in a cloud service or network 118. Such collaboration information/data-structures may include a dictionary database of the behavior features that may be observed and/or analyzed by the network server 116 and/or the mobile device 102, grammar for interpreting, analyzing, combining, and/or applying the behavior features or models, and/or various representations (e.g. a finite state machine, a decision tree, etc.) that map the behavior features to a classification or analysis of the mobile device behaviors, applications, and/or processes.

The partner client 206 module may be configured to decode, interpret, evaluate, combine, organizing and/or encode observed behavior information, mobile device features, and data models into a communication message suitable for transmission to the third-party server and/or suitable for sending to the behavior observer and analyzer modules via the behavior API 214. In various aspects, the communication message may include: information identifying the existence or presence of a condition on the mobile device; a count or frequency of the condition; an ordering of features; an identified combination of events or conditions; a structure or mapping expressed as a finite state machine; an identification or classification (e.g., benign, malicious, suspicious, etc.) of an observed mobile device features or conditions; a mapping of suggested actions/actuations to mobile device features or conditions; recommendations for performing further observation actions; and other similar information. The communication message may also include a request for further observation, a request for behavior logs, and/or a request for actuation.

In various aspects, a request for actuation, which may be configured according to the behavior API 214, may include commands suitable for causing the mobile device to notify the user, block a process, terminate a process, and/or invoke any of the other features of the actuation module 208. In an aspect, the request for actuation may identify applications that are white-listed and/or a command suitable for causing the observer module to back-off or stop observing one or more of the white-listed applications.

In various aspects, a request for a behavior log may identify a granularity level, specific applications (e.g., via an APK name, etc.), a duration or period of time, a process (e.g., via a process identifier, etc.), an urgency or importance indicator, and/or a priority. The behavior logs may be generated to include information collected based on the analysis of the whole device, a specific application, a specific processor, and/or over a specified period of time. The behavior logs may be identified by process ID, name, or signature. In an aspect, the behavior logs may be generated to include behavior vectors storing a series of numbers, each of which may correspond to one of the observed features. In an aspect, the behavior logs may be generated to include the results and/or conclusions generated by the analyzer module, which may indicate whether a specific mobile device behavior is currently deemed as good, bad or suspicious by the mobile device.

In an aspect, the mobile device may be configured to leverage a crowd sourced model received from a network server via a public or private cloud network. The crowd sourced model may be generated in the network server via the server performing, executing, and/or applying machine learning and/or context modeling techniques to behavior information and/or results of behavior analyses provided by many mobile devices. For example, the network server may receive a large number of reports from many mobile devices and analyze, consolidate or otherwise turn such crowd-sourced information into useable information, particularly a lean data set or focused behavior models that can be used or accessed by all mobile devices.

In an aspect, the network server may send incremental updates to the mobile device, and the mobile device may be configured to update its models based on the incremental updates received from the network server. For example, if the network server includes a database that stores ten thousand behavioral rules or records, and a new rule/record is added to the database (e.g. via crowd sourcing data received from many mobile devices), the network server may be configured to send only a portion of a model and/or the new rule or record (as opposed to all ten thousand records) to the mobile device. The mobile device may receive the new rule/record and update its existing models to include the rule.

In an aspect, the network server may periodically or continuously reevaluate existing lean data/behavior models as new behavior/analysis reports are received from mobile devices, and/or generate new or updated lean data/behavior models based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

In an aspect, the network server may be configured to generate the lean data/behavior models to include an initial feature set (e.g., an initial reduced feature model) and one or more subsequent feature sets (e.g., subsequent reduced feature models). The initial feature set may include information determined to have a highest probability of enabling the classifier module of the mobile devices to conclusively determine whether a particular mobile device behavior, software application, or process is malicious/performance-degrading or benign. Each subsequent feature set may include information determined to have the next highest probability of conclusively determining that the mobile device behavior, software application, or process is malicious/performance-degrading or benign. Each subsequent feature set may include a larger dataset than its preceding feature set, and thus the performance and power consumption costs associated with applying the data/behavior models may increase progressively for each subsequent feature set.

In an aspect, the classifier module of the mobile device may include or implement progressive behavior models (or classifiers) that enable the mobile device processor to evaluate the mobile device behaviors in stages. For example, the classifier module may be configured to first apply a lean data/behavior model that includes the initial feature set, then models that include progressively larger feature sets until the classifier module determines that a mobile device behavior is benign or malicious/performance-degrading. The classifier module may then send the results of its operations and/or success rates associated with the application of each model to the network server. The network server may use such results to update its lean data/behavior models (e.g., the features sets included in each model, etc.), thereby refining the data and/or models based on the results/success rates of all reporting mobile devices. The network server may then make the updated lean data/behavior models available to mobile devices as new model apps or upgrades to previously downloaded apps, so mobile devices have access to the refined lean data/behavior models. In this manner, mobile devices can quickly benefit from the behaviors and conclusions of other mobile devices leveraging the software delivery and update mechanism.

In an aspect, the network server may be configured to continuously update the online and offline classifiers, model generators, and/or cloud model. The network server may be configured to intelligently determine when the changes are substantial enough to warrant generating new models and when the changes may be ignored. For example, the network server may receive updates from many different mobile devices, perform machine learning operations to generate a first family of classifiers, determine whether there are enough changes to the generated first family of classifiers to warrant generating new models, determine which features in the generated first family of classifiers are the best features when it is determined that there are enough changes to the first family of classifiers, generate a second family of classifiers based on the best features, determine whether there are enough changes to the generated second family of classifiers, and generate/update mobile device classifier data/behavior models when it is determined that there are enough changes to the second family of classifiers.

In an aspect, the interfaces module may be configured to enable the mobile device to receive fewer or less frequent updates than that which is typically received from a private cloud service. This allows the mobile device to receive updated models at the user's discretion and without requiring constant connectivity to the cloud service.

In various aspects, all or portions of the analyzer module may be downloaded from multiple sources, pre-loaded on the mobile device, downloaded into a client application of the mobile device, and downloaded as a software application form an application download service.

FIGS. 3A-3E illustrate aspect mobile device methods 300 of communicating with a third-party network server in a client-cloud communication system. In block 302, a mobile device processor may receive in a partner client 206 of the mobile device a registration request message and version information from a third-party server. This communication may be accomplished by the third-party server using the client-server interface 212. In block 304, the mobile device processor may request and/or receive an authentication key from the third-party network server. In block 306, the mobile device processor may verify that the received authentication key is valid by comparing the received key to information stored in a private key database or authentication system. Also in block 306, the mobile device processor may register the third-party network server as being an authorized and trusted entity that may communicate with and/or control the mobile device via the partner client 206.

In block 308, the mobile device processor may receive a first list of behavior features from the third-party network server via the client module. The first list of behavior features may include or identify features that are understood by the third-party network server and/or that the server may analyze. The first list may also include features included in the dictionary database of features understood by the mobile device, features that are high-level heuristics, features that are agnostic to the mobile device modules and systems (e.g., operating systems, hardware, etc.), and/or features that are described in high-level file-format or description language (e.g., XML, etc.). In an aspect, the first list may also include an ordering or rating of the relative importance of the various features to the third-party network server.

In block 310, the mobile device processor may access a dictionary database and/or other similar structures to identify the features included in the first list of behavior features that are observable features understood by the mobile device, may be observed in the mobile device, and/or are the best features for enabling the mobile device processor to conclusively determine whether a mobile device behavior is malicious or benign.

In block 312, the mobile device processor may generate a second list of behavior features that includes the observable features determined to be the best features for enabling the mobile device processor to conclusively determine whether a mobile device behavior is malicious or benign, and send the generated second list to the third-party network server. In an aspect, the mobile device processor may generate the second list to include a subset of the features included in the first list of behavior features. In various aspects, the mobile device processor may generate the second list based on an ordering or rating of features included in the first list by third-party network server, an ordering or rating of features as determined by behavior observer and/or analysis modules of the mobile device, cost of observing the features, and/or the availability of mobile device resources (e.g., processing resources, battery resources, etc.).

In block 314, the mobile device processor may receive behavior models and/or other structures that map features to a specific behavior classification (e.g., benign, malicious, suspicious, etc.). In an aspect, the received behavior models/structures may map only the features identified in the second list to a specific behavior classification. In an aspect, in block 314, the mobile device processor may receive a finite state machine (FSM) description mapping the various features to good/bad/suspicious behavior.

In block 316, the mobile device processor may observe mobile device behaviors over a period of time and collect behavior information suitable for use in identifying mobile device behaviors that are inconsistent with normal operation patterns. In block 318, the mobile device processor may compare observed mobile device behaviors to the received models/mappings to determine whether an observed behavior is suspicious or malicious/performance-degrading.

In determination block 320, the mobile device processor may determine whether the behavior is suspicious. If the mobile device processor determines that the observed behavior is malicious/performance-degrading (i.e., determination block 320="Malicious"), in block 322, the mobile device processor may perform various operations to correct or prevent the malicious/performance-degrading behavior. The processor may return to observing mobile device behaviors in block 316.

If the mobile device processor determines that the observed behaviors are benign (i.e., determination block 320="Benign"), in block 324, the mobile device processor may ignore the behavior and/or log or register the behavior as benign, and return to observing mobile device behaviors in block 316.

If the mobile device processor determines that the observed behaviors are suspicious (i.e., determination block 320="Suspicious"), the mobile device processor may perform any of the operations illustrated in FIGS. 3B-3E, and return to observing mobile device behaviors in block 316. This process may continue until the processor conclusively determines that the observed behavior is either benign or malicious/performance-degrading.

Figure 3A:
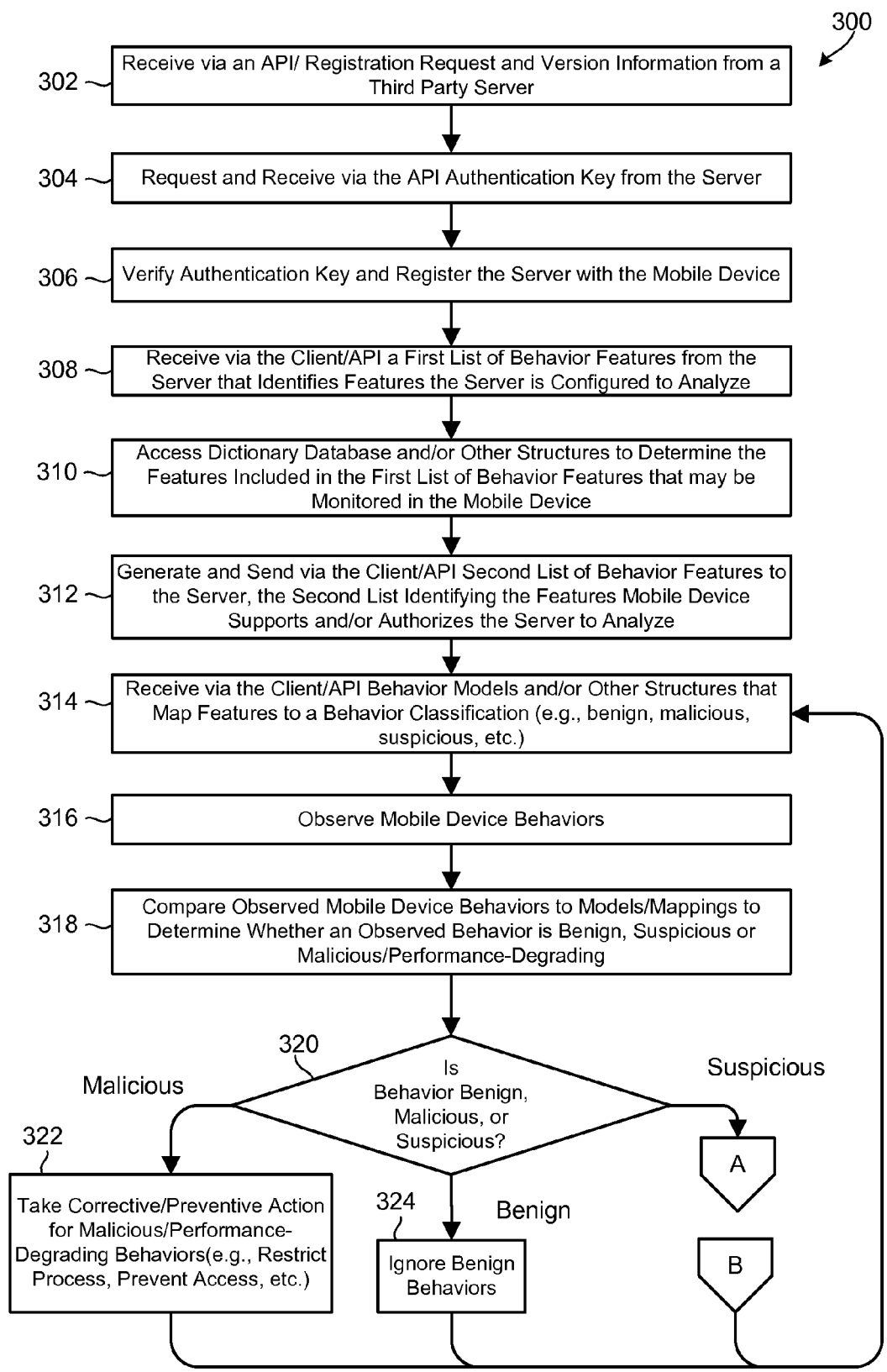
FIGS. 3A through 3E are process flow diagrams illustrating aspect mobile device methods of communicating with a third-party server to determine whether a particular mobile device behavior, software application, or process is performance-degrading, suspicious, or benign.
Figure 3B:
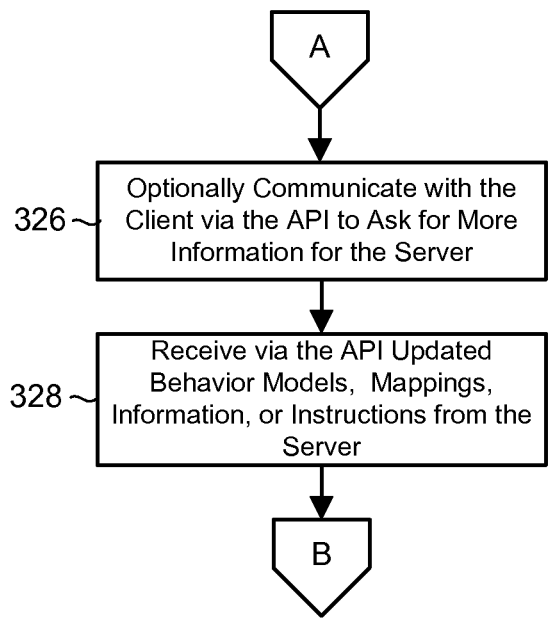

FIG. 3B illustrates that if the mobile device processor determines that the observed behaviors are suspicious (i.e., determination block 320="Suspicious"), in block 326, the mobile device processor may optionally communicate with the partner client 206 via the behavior API 214 to ask for more information from the network server. In block 328, the mobile device processor may receive (e.g., via the client-server interface 212, partner client 206 and/or behavior API 214) updated behavior models, mappings, information, or instructions from the third-party server. After updated information is stored, the processor may return to observing mobile device behaviors in block 316 and the process may continue until the processor conclusively determines that the observed behavior is benign, suspicious, or malicious/performance-degrading.

Figure 3C:
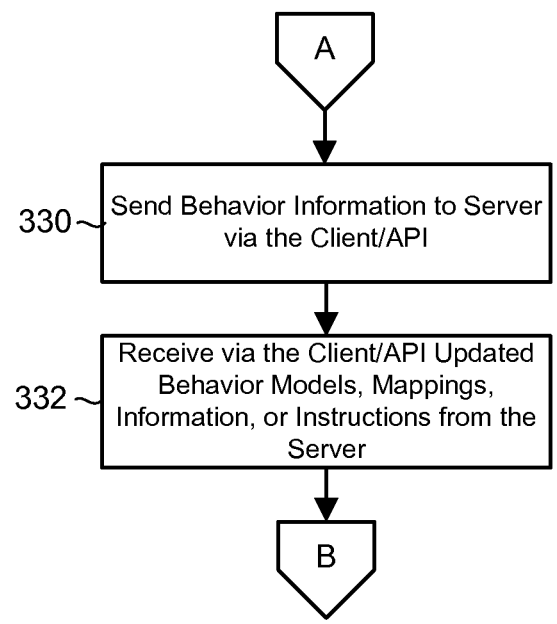

FIG. 3C illustrates that if the mobile device processor determines that the observed behaviors are suspicious (i.e., determination block 320="Suspicious"), in block 330, the mobile device processor may send behavior information to the third-party server via the partner client 206. In block 328, the mobile device processor may receive updated behavior models, mappings, information, or instructions from the third-party server. After updated information is stored, the processor may return to observing mobile device behaviors in block 316 and the process may continue until the processor conclusively determines that the observed behavior is benign, suspicious, or malicious/performance-degrading.

Figure 3D:
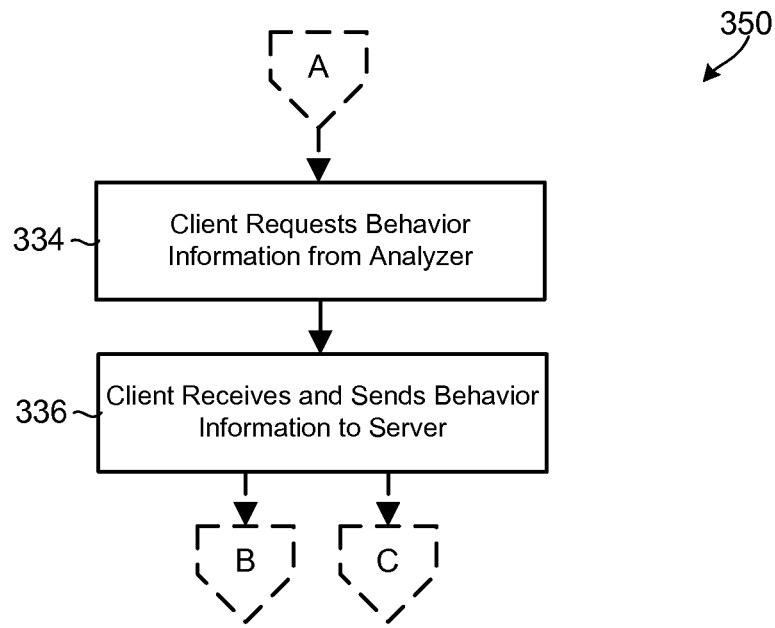

FIG. 3D illustrates an aspect partner client method 350 of requesting behavior information from a behavior analyzer. The operations of method 350 may be performed when the mobile device processor determines that the observed behaviors are suspicious (i.e., determination block 320="Suspicious"), or in response to any detectable event. In various aspects, the operations of method 350 may be initiated by the mobile device and/or a third-party server.

In block 334 of method 350, the partner client module may request behavior information from a behavior observer or behavior analyzer modules via the behavior API 214. In block 336, the partner client 206 may receive the behavior information and send the behavior information to a third-party server. In various aspects, the processor may wait to receive updated behavior models from the third-party server or return to observing mobile device behaviors in block 316.

Figure 3E:
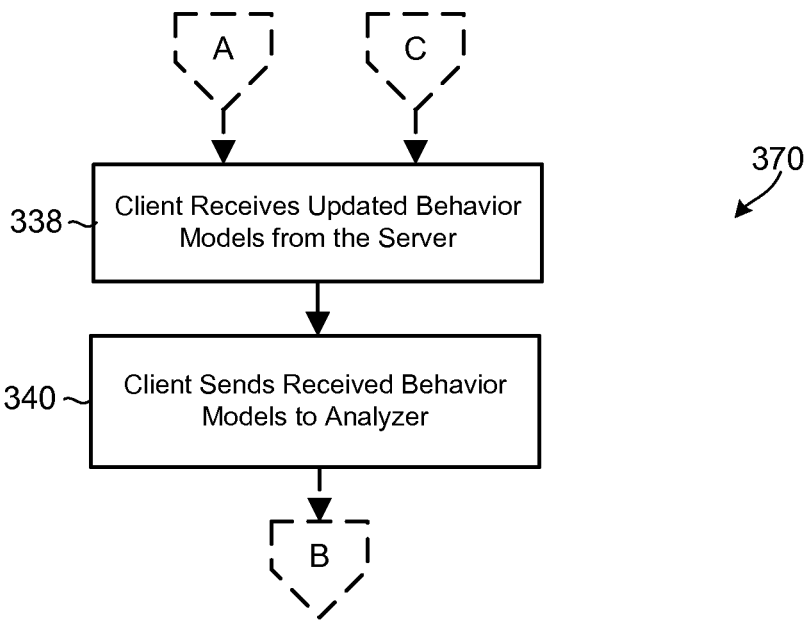

FIG. 3E illustrates an aspect partner client 206 method 370 of receiving behavior from a behavior analyzer. The operations of method 370 may be performed after block 336 illustrated in FIG. 3D, when the mobile device processor determines that the observed behaviors are suspicious (i.e., determination block 320="Suspicious"), periodically, or in response to any detectable event. In block 338 of method 370, the partner client module may receive updated behavior models from the third-party server. In block 340, the partner client module may send the received behavior models to the analyzer module via the behavior API module. The processor may return to observing mobile device behaviors in block 316.

Figure 4:
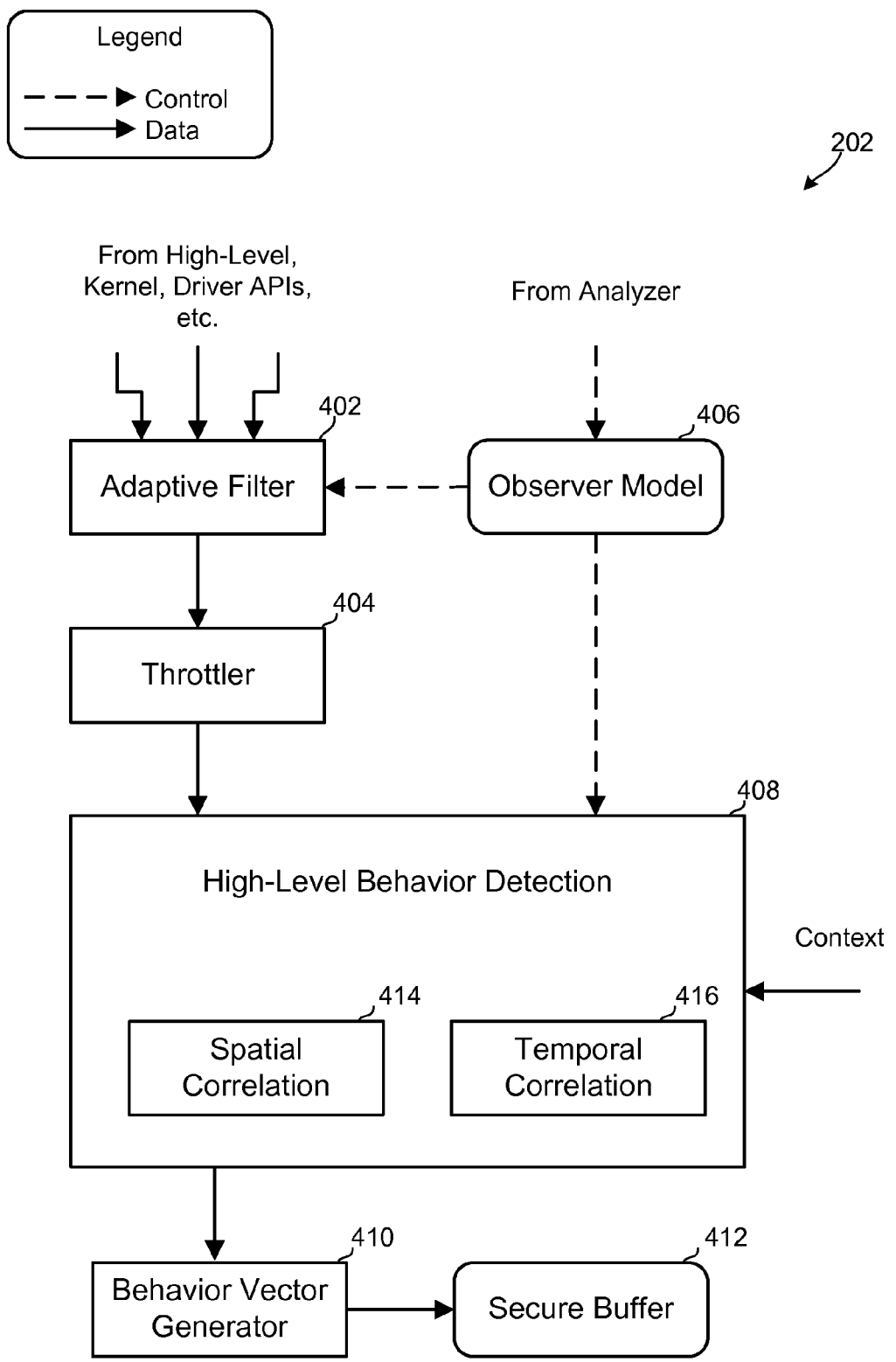
FIG. 4 is a block diagram illustrating example logical components and information flows in an observer module configured to perform dynamic and adaptive observations of mobile device behaviors.

FIG. 4 illustrates example logical components and information flows in a behavior observer module 202 of a computing system configured to perform dynamic and adaptive observations in accordance with an aspect. The behavior observer module 202 may include an adaptive filter module 402, a throttle module 404, an observer mode module 406, a high-level behavior detection module 408, a behavior vector generator 410, and a secure buffer 412. The high-level behavior detection module 408 may include a spatial correlation module 414 and a temporal correlation module 416.

The observer mode module 406 may receive control information from various sources, which may include an analyzer unit (e.g., the analyzer module 204 described above with reference to FIG. 2) and/or an application API. The observer mode module 406 may send control information pertaining to various observer modes to the adaptive filter module 402 and the high-level behavior detection module 408.

The adaptive filter module 402 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 404, which may be responsible for controlling the amount of information flowing from the filter to ensure that the high-level behavior detection module 408 does not become flooded or overloaded with requests or information.

The high-level behavior detection module 408 may receive data/information from the throttle module 404, control information from the observer mode module 406, and context information from other components of the mobile device. The high-level behavior detection module 408 may use the received information to perform spatial and temporal correlations to detect or identify high level behaviors that may cause the device to perform at sub-optimal levels. The results of the spatial and temporal correlations may be sent to the behavior vector generator 410, which may receive the correlation information and generate a behavior vector that describes the behaviors of particular process, application, or sub-system. In an aspect, the behavior vector generator 410 may generate the behavior vector such that each high-level behavior of a particular process, application, or sub-system is an element of the behavior vector. In an aspect, the generated behavior vector may be stored in a secure buffer 412. Examples of high-level behavior detection may include detection of the existence of a particular event, the amount or frequency of another event, the relationship between multiple events, the order in which events occur, time differences between the occurrence of certain events, etc.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide verity of sources.

As discussed above, the behavior observer module 202 may perform adaptive observation techniques and control the observation granularity based on information received from a variety of sources. For example, the high-level behavior detection module 408 may receive information from the throttle module 404, the observer mode module 406, and context information received from other components (e.g., sensors) of the mobile device. As an example, a high-level behavior detection module 408 performing temporal correlations might detect that a camera has been used and that the mobile device is attempting to upload the picture to a server. The high-level behavior detection module 408 may also perform spatial correlations to determine whether an application on the mobile device took the picture while the device was holstered and attached to the user's belt. The high-level behavior detection module 408 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 408 may recognize this as a potentially threatening behavior and initiate an appropriate response (e.g., shutting off the camera, sounding an alarm, etc.).

In an aspect, the behavior observer module 202 may be implemented in multiple parts.

Figure 5:
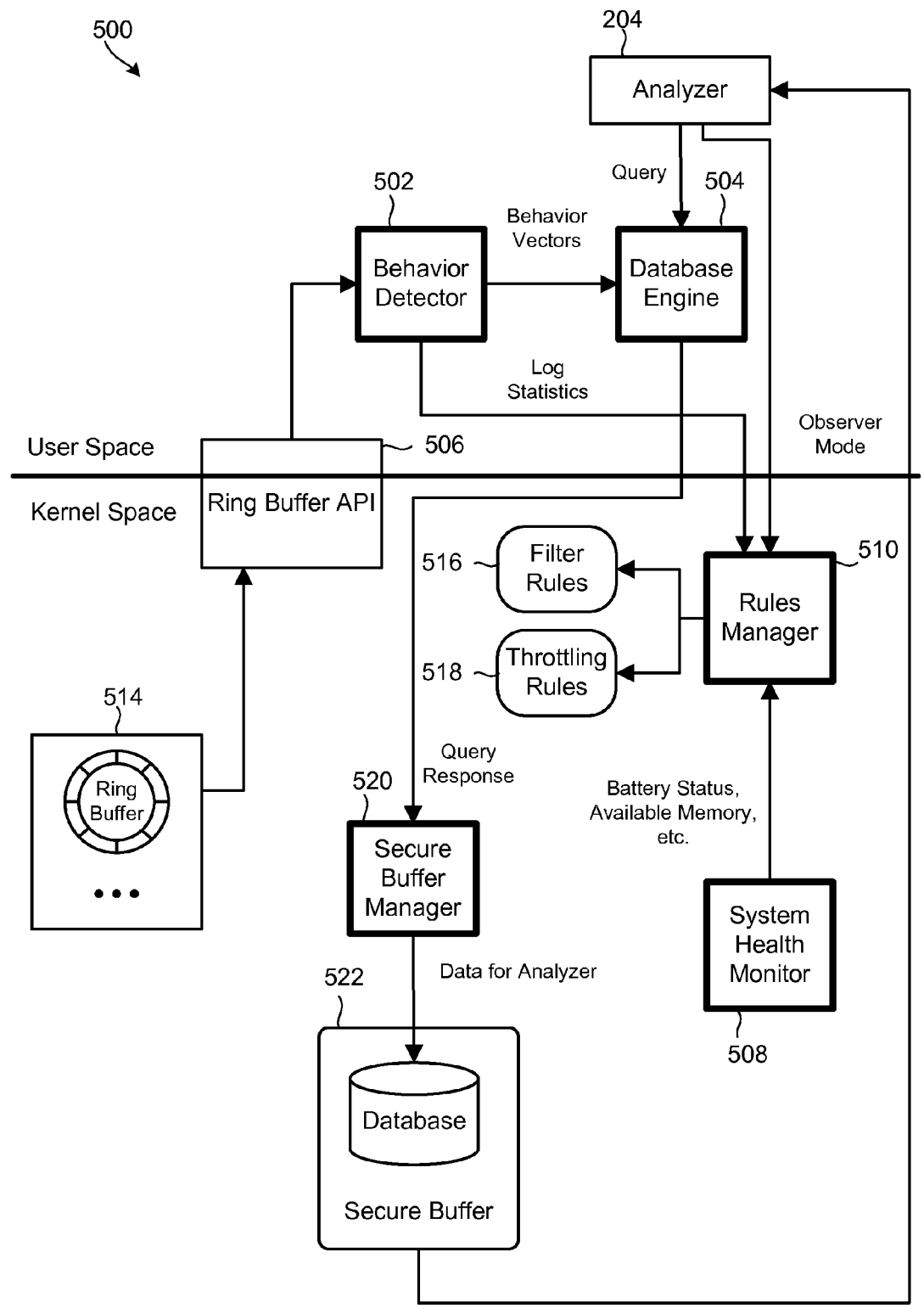
FIG. 5 is a block diagram illustrating logical components and information flows in a computing system implementing observer daemons in accordance with an aspect.

FIG. 5 illustrates logical components and information flows in a computing system 500 implementing an aspect observer daemon. In the example illustrated in FIG. 5, the computing system 500 includes a behavior detector 502 module, a database engine 504 module, and an analyzer module 204 in the user space, and a ring buffer 514, a filter rules 516 module, a throttling rules 518 module, and a secure buffer 520 in the kernel space. The computing system 500 may further include an observer daemon that includes the behavior detector 502 and the database engine 504 in the user space, and the secure buffer manager 520, the rules manager 510, and the system health monitor 508 in the kernel space. The computing system 500 may further include a ring buffer API 506 for communicating information stored in the ring buffer 514 to the behavior detector 502 module.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 6:
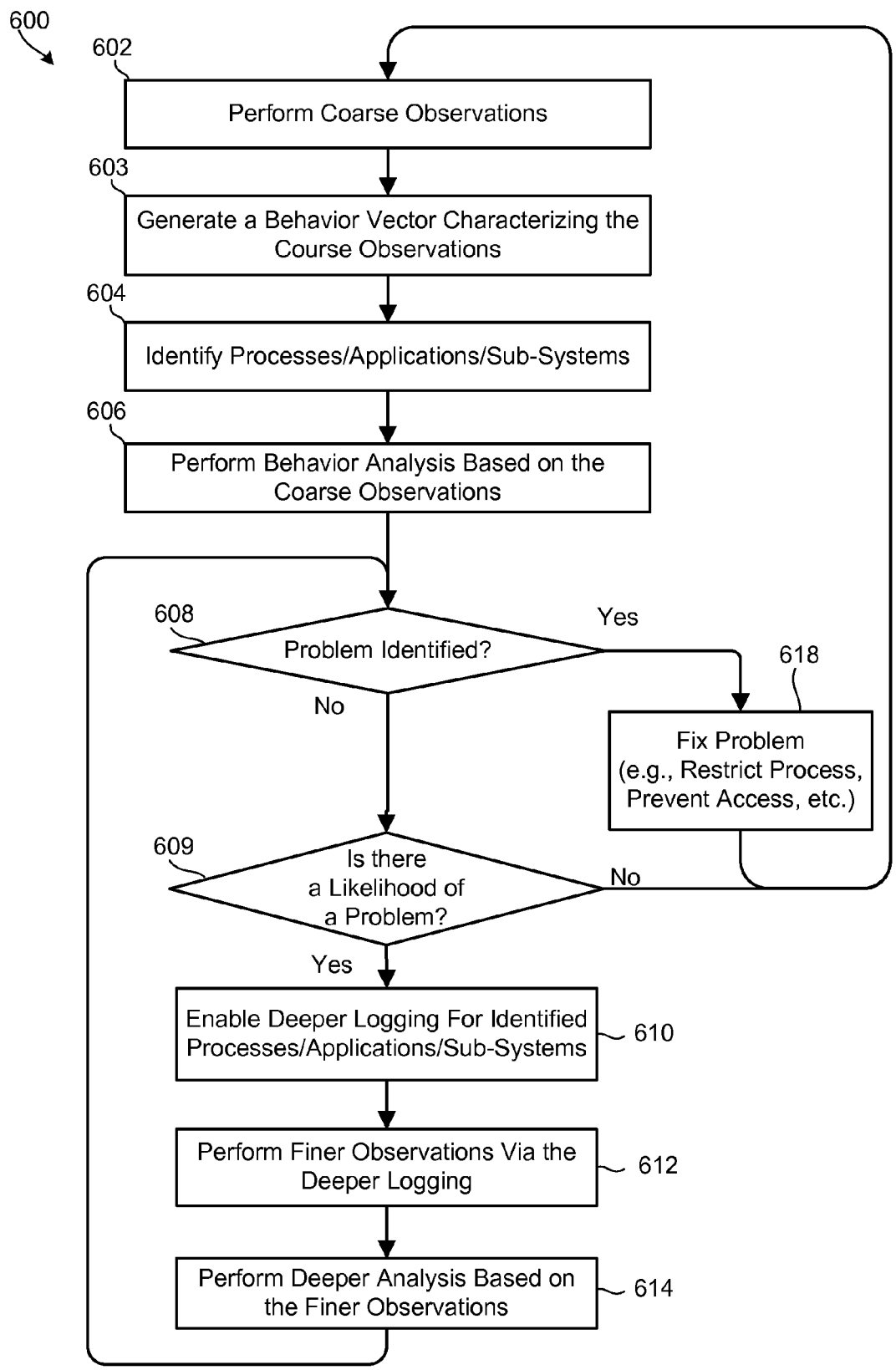
FIG. 6 is a process flow diagram illustrating an aspect method for performing adaptive observations on mobile devices.

FIG. 6 illustrates an example method 600 for performing dynamic and adaptive observations in accordance with an aspect. In block 602, the mobile device processor may perform coarse observations by monitoring/observing a subset of large number factors/behaviors that could contribute to the mobile device's degradation. In block 603, the mobile device processor may generate a behavior vector characterizing the coarse observations and/or the mobile device behavior based on the coarse observations. In block 604, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 606, the mobile device processor may perform behavioral analysis operations based on the coarse observations. In an aspect, as part of blocks 603 and 604, the mobile device processor may perform one or more of the operations discussed above with reference to FIG. 3.

In determination block 608, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 608="Yes"), in block 618, the processor may initiate a process to correct the behavior and return to block 602 to perform additional coarse observations.

When the mobile device processor determines that the suspicious behaviors or potential problems can not be identified and/or corrected based on the results of the behavioral analysis (i.e., determination block 608="No"), in determination block 609 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 609="No"), the processor may return to block 602 to perform additional coarse observations.

When the mobile device processor determines that there is a likelihood that suspicious behaviors or potential problems exist and/or are detectable (i.e., determination block 609="Yes"), in block 610, the mobile device processor may perform deeper logging/observations or final logging on the identified subsystems, processes or applications. In block 612, the mobile device processor may perform deeper and more detailed observations on the identified subsystems, processes or applications. In block 614, the mobile device processor may perform further and/or deeper behavioral analysis based on the deeper and more detailed observations. In determination block 608, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 608="No"), the processor may repeat the operations in blocks 610-614 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 608="Yes"), in block 618, the mobile device processor may perform operations to correct the problem/behavior, and the processor may return to block 602 to perform additional operations.

In an aspect, as part of blocks 602-618 of method 600, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 7A:
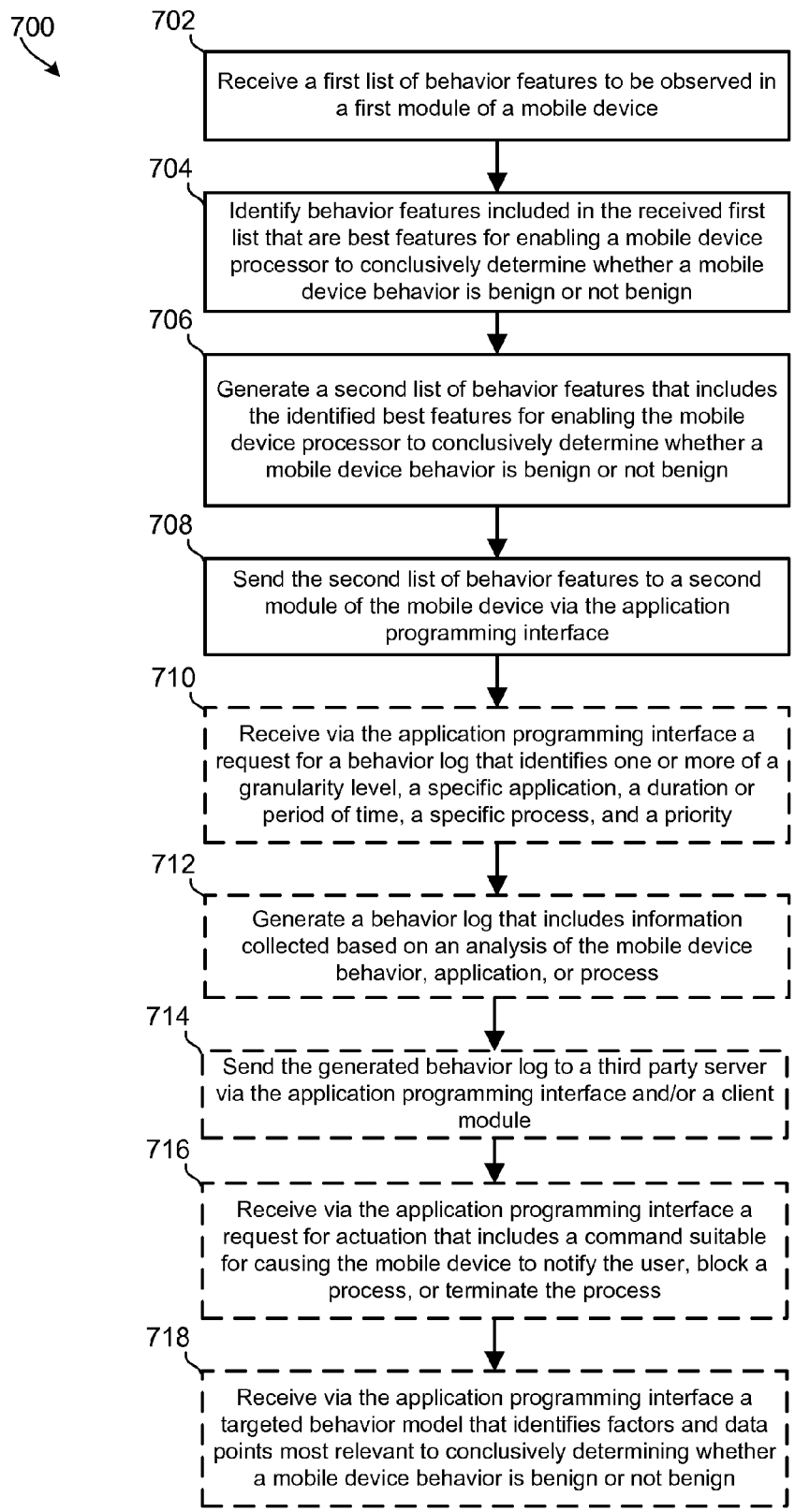
FIG. 7A is a process flow diagram illustrating an aspect mobile device method of communicating behavior analysis information in a mobile device by exchanging information regarding behavior features observed in the mobile device between a first module and a second module of the mobile device via an application programming interface.

FIG. 7A illustrates an aspect method 700 of communicating behavior analysis information by exchanging information regarding behavior features observed in the mobile device between a first module and a second module of the mobile device via the application programming interface. The exchanged information may include the behavior features used by one of the first and second modules to determine whether a mobile device behavior is benign or not benign. In block 702, a mobile device processor may receive a first list of behavior feature to be observed in a first module of the mobile device. In block 704, the mobile device processor my identify behavior features included in the received first list that are the best features for enabling a processor to conclusively determine whether a mobile device behavior is benign or not benign. In block 706, the mobile device processor may generate a second list of behavior features that includes the identified best features for enabling the mobile device processor to conclusively determine whether a mobile device behavior is benign or not benign. In block 708, the mobile device processor may send the second list of behavior features to a second module of the mobile device via the application programming interface.

In optional block 710, the mobile device processor may receive, via a client module and/or the application programming interface, a request for a behavior log that identifies one or more of a granularity level, a specific application, a duration or period of time, a specific process, and a priority. In optional block 712, the mobile device processor may generate a behavior log that includes information collected based on an analysis of the mobile device behavior, application, or process. In optional block 714, the mobile device processor may send the generated behavior log to a third party server via a client module and/or the application programming interface. In optional block 716, the mobile device processor may receive via a client module and/or application programming interface a request for actuation that includes a command suitable for causing the mobile device to notify a mobile device user, block a process, or terminate the process. In optional block 718, the mobile device processor may receive via a targeted behavior model that identifies factors and data points most relevant to conclusively determining whether a mobile device behavior is benign or not benign.

In the various aspects, the first and second modules may any of the modules discussed above with reference to FIG. 2, such as the behavior observer module 202, the behavior analysis module 204, partner client module 206, etc.

Figure 7B:
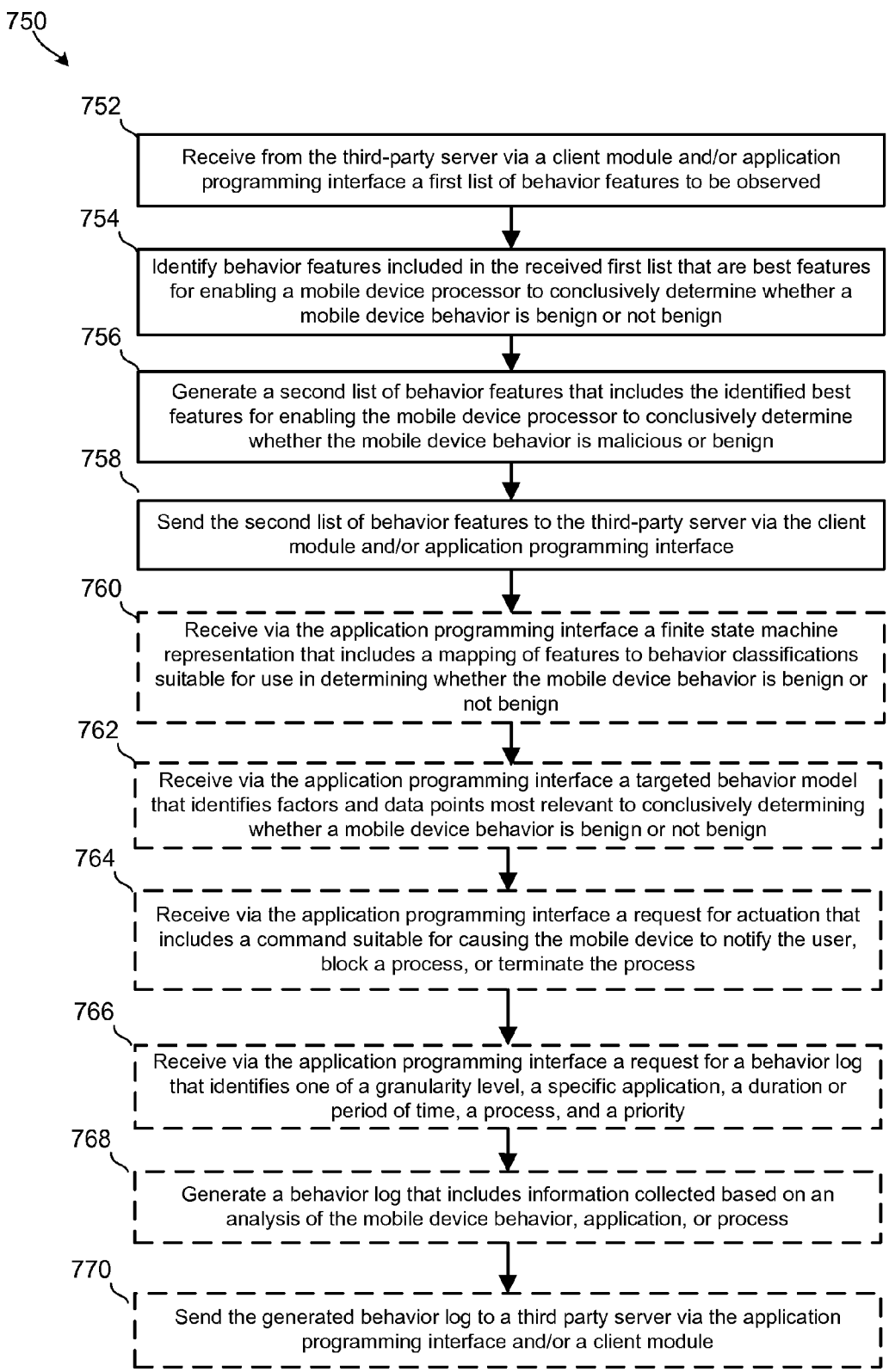
FIG. 7B is a process flow diagram illustrating an aspect mobile device method of communicating behavior-analysis information with a third-party server in a client-cloud communication system via a client module and/or an application programming interface.

FIG. 7B illustrates an aspect method 750 of communicating behavior analysis information with a third-party server in a client-cloud communication system using an application programming interface. In block 752, a mobile device processor may receive from the third-party server via a client module and/or application programming interface a first list of behavior features to be observed. In block 754, the mobile device processor may identify behavior features included in the received first list that are best features for enabling a mobile device processor to conclusively determine whether a mobile device behavior is benign or not benign. In block 756, the mobile device processor may generate a second list of behavior features that includes the identified best features for enabling the mobile device processor to conclusively determine whether the mobile device behavior is malicious or benign. In block 758, the mobile device processor may send the second list of behavior features to the third-party server via the client module and/or application programming interface.

In optional block 760, the mobile device processor may receive via the application programming interface a finite state machine representation that includes a mapping of features to behavior classifications suitable for use in determining whether the mobile device behavior is benign or not benign. In optional block 762, the mobile device processor may receive via the application programming interface a targeted behavior model that identifies factors and data points most relevant to conclusively determining whether a mobile device behavior is benign or not benign. In optional block 764, the mobile device processor may receive via the application programming interface a request for actuation that includes a command suitable for causing the mobile device to notify the user, block a process, or terminate the process. In optional block 766, the mobile device processor may receive via the application programming interface a request for a behavior log that identifies one of a granularity level, a specific application, a duration or period of time, a process, and a priority. In optional block 768, the mobile device processor may generate a behavior log that includes information collected based on an analysis of the mobile device behavior, application, or process. In optional block 770, the mobile device processor may send the generated behavior log to a third party server via the application programming interface and/or a client module.

Figure 8:
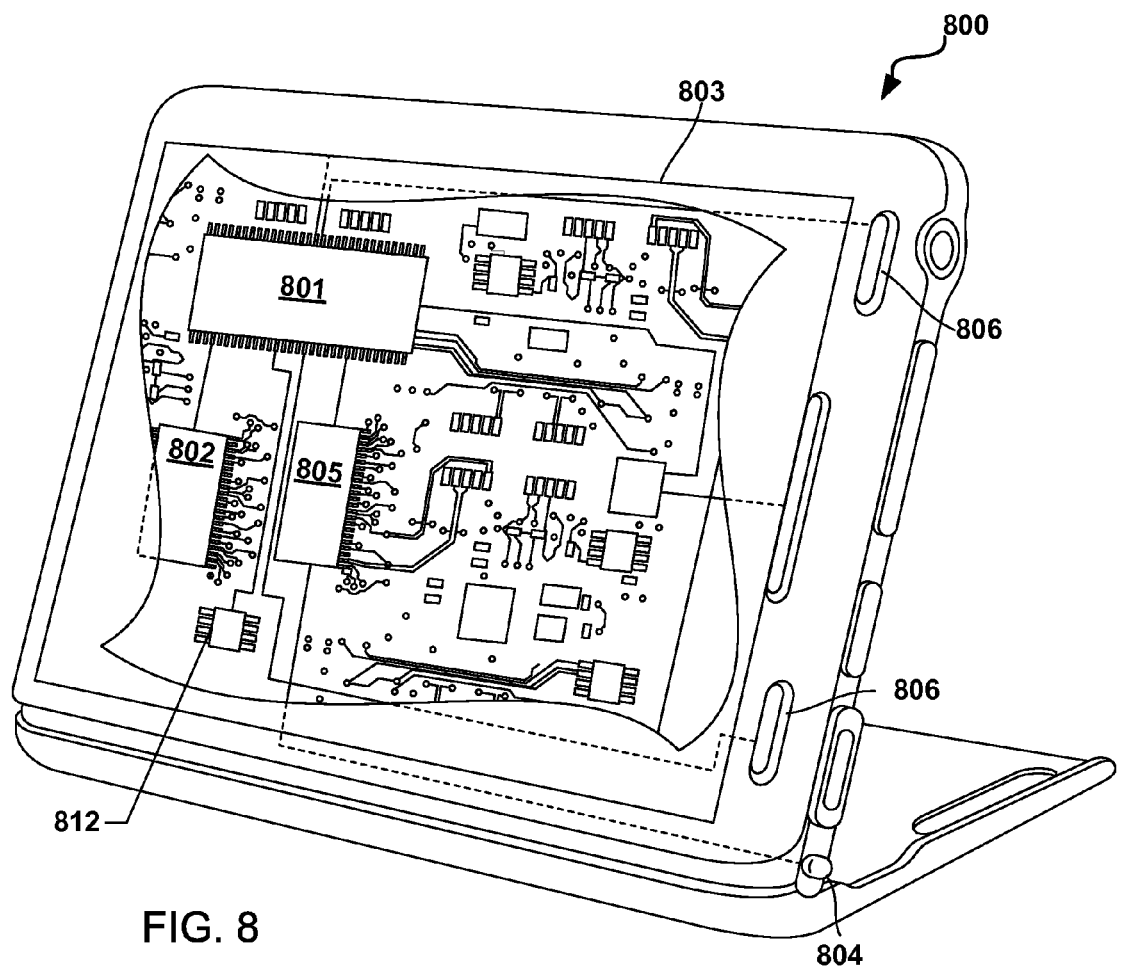
FIG. 8 is a component block diagram of a mobile device suitable for use in an aspect.

The various aspects may be implemented on a variety of mobile computing devices, an example of which is illustrated in FIG. 8 in the form of a smartphone. A smartphone 800 may include a processor 801 coupled to internal memory 802, a display 803, and to a speaker. Additionally, the smartphone 800 may include an antenna 804 for sending and receiving electromagnetic radiation that may be connected to a wireless data link and/or cellular telephone transceiver 805 coupled to the processor 801. Smartphones 800 typically also include menu selection buttons or rocker switches 806 for receiving user inputs.

A typical smartphone 800 also includes a sound encoding/decoding (CODEC) circuit 812, which digitizes sound received from a microphone into data packets suitable for wireless transmission and decodes received sound data packets to generate analog signals that are provided to the speaker to generate sound. Also, one or more of the processor 801, wireless transceiver 805 and CODEC 812 may include a digital signal processor (DSP) circuit (not shown separately).

Figure 9:
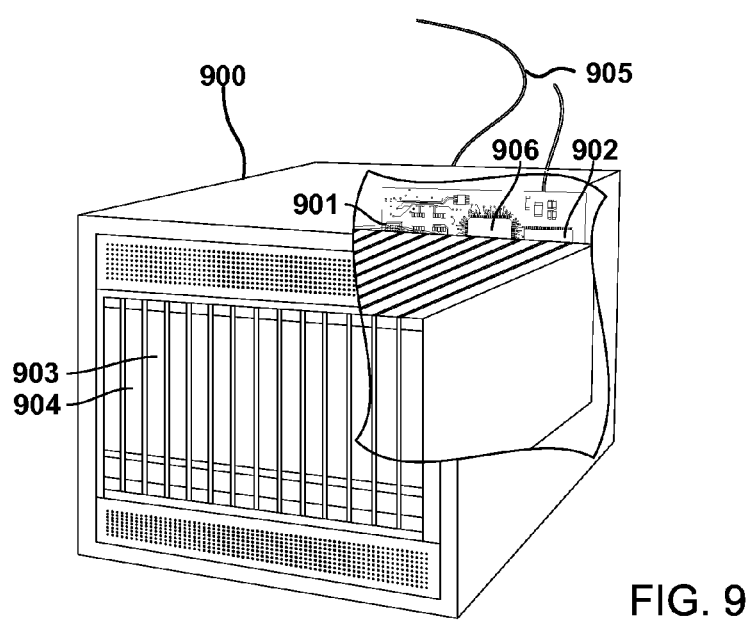
FIG. 9 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing data connections with a network 905, such as a local area network coupled to other broadcast system computers and servers.

The processors 801, 901 may be any programmable microprocessor, microcomputer or multiple processor chip or chips that can be configured by software instructions (applications) to perform a variety of functions, including the functions of the various aspects described below. In some mobile devices, multiple processors 801 may be provided, such as one processor dedicated to wireless communication functions and one processor dedicated to running other applications. Typically, software applications may be stored in the internal memory 802, 902, 903 before they are accessed and loaded into the processor 801, 901. The processor 801, 901 may include internal memory sufficient to store the application software instructions.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

As used in this application, the terms "component," "module," "system," "engine," "manager," and the like are intended to include a computer-related entity, such as, but not limited to, hardware, firmware, a combination of hardware and software, software, or software in execution, which are configured to perform particular operations or functions. For example, a module or component may be, but are not limited to, a process running on a processor, a thread of execution, an object, an executable, a software application program, a processor, and/or a computer. By way of illustration, both an application running on a computing device and the computing device may be referred to as a component. In addition, one or more components or modules may reside within a process and/or thread of execution and may be localized on one processor or core and/or distributed between two or more processors or cores. In addition, these components/modules may execute from various non-transitory computer readable media having various instructions and/or data structures stored thereon. Modules may communicate by way of local and/or remote processes, function or procedure calls, electronic signals, data packets, memory read/writes, and other known computer, processor, and/or process related communication methodologies.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of communicating behavior-analysis information in a mobile device using an application programming interface, comprising:

receiving, by a first daemon operating on the mobile device via a mobile device processor of the mobile device, a finite state machine representation from a second daemon operating on the mobile device, the received finite state machine representation including a mapping of features to behavior classifications;

receiving, by the first daemon operating on the mobile device and via the application programming interface, a targeted behavior model from the second daemon operating on the mobile device;

applying a behavior vector to the received targeted behavior model to generate an analysis result;

using the generated analysis result and the received finite state machine representation to determine whether a mobile device behavior may be classified as benign or performance degrading;

sending, by the first daemon operating on the mobile device and via the application programming interface, a request to receive more information from a server to the second daemon operating on the mobile device in response to the first daemon determining that the mobile device behavior may not be classified as benign or performance degrading based on the generated analysis result and the received finite state machine representation; and receiving, by the first daemon operating on the mobile device and via the application programming interface, an updated behavior model from the second daemon operating on the mobile device in response to the first daemon sending the request to receive more information from the server to the second daemon.

2. The method of claim 1, wherein receiving, by the first daemon operating on the mobile device and via the application programming interface, the targeted behavior model from the second daemon operating on the mobile device comprises receiving, by the first daemon operating on the mobile device and via the application programming interface, an XML file.

3. The method of claim 1, further comprising:
receiving, by the first daemon operating on the mobile device and via the application programming interface, a request for actuation that includes a command suitable for causing the mobile device to notify a mobile device user, block a process, or terminate the process.

4. The method of claim 1, further comprising:
receiving, by the first daemon operating on the mobile device and via the application programming interface, a request for a behavior log that identifies one of a granularity level, a specific application, a duration or period of time, a process, and a priority.

5. The method of claim 4, further comprising:
generating, by the mobile device processor, the behavior log to include information collected based on an analysis of one of the mobile device behavior, the specific application, and the process.

6. A mobile device, comprising:
a transceiver;
a memory; and
a processor coupled to the transceiver and the memory, wherein the processor is configured with processor-executable instructions to perform operations comprising:
receiving, by a first daemon operating on the mobile device, a finite state machine representation from a second daemon operating on the mobile device, the received finite state machine representation including a mapping of features to behavior classifications;

receiving, by the first daemon operating on the mobile device and via an application programming interface, a targeted behavior model from the second daemon operating on the mobile device;

applying a behavior vector to the received targeted behavior model to generate analysis result;

using the generated analysis result and the received finite state machine representation to determine whether a mobile device behavior may be classified as benign or performance degrading;

sending, by the first daemon operating on the mobile device and via the application programming interface, a request to receive more information from a server to the second daemon operating on the mobile device in response to the first daemon determining that the mobile device behavior may not be classified as benign or performance degrading based on the generated analysis result and the received finite state machine representation; and receiving, by the first daemon operating on the mobile device and via the application programming interface, an updated behavior model from the second daemon operating on the mobile device in response to the first daemon sending the request to receive more information from the server to the second daemon.

7. The mobile device of claim 6, wherein the processor is configured with processor-executable instructions to perform operations such that receiving, by the first daemon operating on the mobile device and via the application programming interface, the targeted behavior model comprises receiving, by the first daemon operating on the mobile device and via the application programming interface, an XML file.

8. The mobile device of claim 6, wherein the processor is configured with processor-executable instructions to perform operations further comprising:

receiving, by the first daemon operating on the mobile device and via the application programming interface, a request for actuation that includes a command suitable for causing the mobile device to notify a mobile device user, block a process, or terminate the process.

9. The mobile device of claim 6, wherein the processor is configured with processor-executable instructions to perform operations further comprising:

receiving, by the first daemon operating on the mobile device and via the application programming interface, a request for a behavior log that identifies one of a granularity level, a specific application, a duration or period of time, a process, and a priority.

10. The mobile device of claim 9, wherein the processor is configured with processor-executable instructions to perform operations further comprising:

generating the behavior log to include information collected based on an analysis of one of the mobile device behavior, the specific application, and the process.

11. A non-transitory computer readable storage medium having stored thereon processor-executable software instructions configured to cause a mobile device processor to perform operations for communicating behavior-analysis information in a mobile device using an application programming interface, the operations comprising:

receiving, by a first daemon operating on the mobile device, a finite state machine representation from a second daemon operating on the mobile device, the received finite state machine representation including a mapping of features to behavior classifications;

receiving, by the first daemon operating on the mobile device and via the application programming interface, a targeted behavior model from the second daemon operating on the mobile device;

applying a behavior vector to the received targeted behavior model to generate analysis result;

using the generated analysis result and the received finite state machine representation to determine whether a mobile device behavior may be classified as benign and or performance degrading;

sending, by the first daemon operating on the mobile device and via the application programming interface, a request to receive more information from a server to the second daemon operating on the mobile device in response to the first daemon determining that the mobile device behavior may not be classified as of benign or performance degrading based on the generated analysis result and the received finite state machine representation; and receiving, by the first daemon operating on the mobile device and via the application programming interface, an updated behavior model from the second daemon operating on the mobile device in response to the first daemon sending the request to receive more information from the server to the second daemon.

12. The non-transitory computer readable storage medium of claim 11, wherein the stored processor-executable software instructions are configured to cause the mobile device processor to perform operations such that receiving, by the first daemon operating on the mobile device and via the application programming interface, the targeted behavior model comprises, by the first daemon operating on the mobile device and via the application programming interface, receiving an XML file.

13. The non-transitory computer readable storage medium of claim 11, wherein the stored processor-executable software instructions are configured to cause the mobile device processor to perform operations further comprising:

receiving, by the first daemon operating on the mobile device and via the application programming interface, a request for actuation that includes a command suitable for causing the mobile device to notify a mobile device user, block a process, or terminate the process.

14. The non-transitory computer readable storage medium of claim 11, wherein the stored processor-executable software instructions are configured to cause the mobile device processor to perform operations further comprising:

receiving, by the first daemon operating on the mobile device and via the application programming interface a request for a behavior log that identifies one of a granularity level, a specific application, a duration or period of time, a process, and a priority.

15. The non-transitory computer readable storage medium of claim 14, wherein the stored processor-executable software instructions are configured to cause the mobile device processor to perform operations further comprising:

generating the behavior log to include information collected based on an analysis of one of the mobile device behavior, the specific application, and the process.

* * * * *